United States Patent
Foster et al.

(10) Patent No.: US 12,227,206 B2
(45) Date of Patent: Feb. 18, 2025

(54) SYSTEMS AND METHODS FOR OPERATING AN AUTONOMOUS VEHICLE

(71) Applicant: TuSimple, Inc., San Diego, CA (US)

(72) Inventors: Scott Douglas Foster, San Diego, CA (US); Dishi Li, Menifee, CA (US); Hunter Scott Willoughby, San Diego, CA (US); Yufei Zhao, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 196 days.

(21) Appl. No.: 17/965,893

(22) Filed: Oct. 14, 2022

(65) Prior Publication Data

US 2023/0119659 A1   Apr. 20, 2023

Related U.S. Application Data

(60) Provisional application No. 63/255,839, filed on Oct. 14, 2021.

(51) Int. Cl.
 *B60W 60/00* (2020.01)
 *B60W 30/18* (2012.01)
 (Continued)

(52) U.S. Cl.
 CPC .. *B60W 60/0011* (2020.02); *B60W 30/18163* (2013.01); *B60W 40/02* (2013.01);
 (Continued)

(58) Field of Classification Search
 CPC ....... B60W 60/0011; B60W 30/18163; B60W 40/02; B60W 50/0097; B60W 50/14;
 (Continued)

(56) References Cited

U.S. PATENT DOCUMENTS 9,598,076 B1 * 3/2017 Jain .................. G06V 20/58
2013/0261872 A1  10/2013 Ferguson et al.
(Continued)

FOREIGN PATENT DOCUMENTS

DE   102013003215 A1   9/2013
DE   102016008514 A1   2/2017
(Continued)

OTHER PUBLICATIONS

International Search Report from corresponding International Application No. PCT/US2022/071992, dated Sep. 13, 2022.
(Continued)

*Primary Examiner* — Tyler D Paige
(74) *Attorney, Agent, or Firm* — Perkins Coie LLP

(57) ABSTRACT

An autonomous vehicle (AV) includes features that allows the AV to comply with applicable regulations and statutes for performing safe driving operation. An example method includes detecting that a group of motorcycles is operating on a roadway on which the AV is located. The group of motorcycles are each located within a pre-determined distance away from one another. The method further includes determining an aggregate footprint area that surrounds respective locations of the group of motorcycles. The method further includes causing navigation of the autonomous vehicle that avoids penetration of the aggregate footprint area based on transmitting navigation instructions to one or more subsystems of the autonomous vehicle.

17 Claims, 12 Drawing Sheets

(51) Int. Cl.
- *B60W 40/02* (2006.01)
- *B60W 50/00* (2006.01)
- *B60W 50/14* (2020.01)
- *G01S 17/08* (2006.01)
- *G01S 17/58* (2006.01)
- *G01S 17/89* (2020.01)
- *G01S 17/931* (2020.01)
- *G06F 18/2413* (2023.01)

(52) U.S. Cl.
CPC ........ *B60W 50/0097* (2013.01); *B60W 50/14* (2013.01); *B60W 60/0015* (2020.02); *B60W 60/0027* (2020.02); *B60W 60/00274* (2020.02); *G01S 17/08* (2013.01); *G01S 17/58* (2013.01); *G01S 17/89* (2013.01); *G01S 17/931* (2020.01); *G06F 18/24137* (2023.01); *B60W 2300/145* (2013.01); *B60W 2420/403* (2013.01); *B60W 2420/408* (2024.01); *B60W 2520/06* (2013.01); *B60W 2520/10* (2013.01); *B60W 2520/22* (2013.01); *B60W 2530/10* (2013.01); *B60W 2552/10* (2020.02); *B60W 2552/30* (2020.02); *B60W 2554/20* (2020.02); *B60W 2554/4026* (2020.02); *B60W 2554/4041* (2020.02); *B60W 2554/4042* (2020.02); *B60W 2554/4045* (2020.02); *B60W 2554/4046* (2020.02); *B60W 2554/4049* (2020.02); *B60W 2554/80* (2020.02); *B60W 2556/40* (2020.02); *B60W 2556/45* (2020.02); *B60W 2556/65* (2020.02); *B60W 2710/06* (2013.01); *B60W 2754/20* (2020.02)

(58) Field of Classification Search
CPC ......... B60W 60/0015; B60W 60/0027; B60W 60/00274; B60W 2300/145; B60W 2420/403; B60W 2420/408; B60W 2520/06; B60W 2520/10; B60W 2520/22; B60W 2530/10; B60W 2552/10; B60W 2552/30; B60W 2554/20; B60W 2554/4026; B60W 2554/4041; B60W 2554/4042; B60W 2554/4045; B60W 2554/4046; B60W 2554/4049; B60W 2554/80; B60W 2556/40; B60W 2556/45; B60W 2556/65; B60W 2710/06; B60W 2754/20; B60W 2300/14; B60W 30/143; B60W 2530/203; B60W 2552/20; B60W 2552/50; B60W 30/09; B60W 2552/53; B60W 2554/40; B60W 2554/402; B60W 2554/801; B60W 2554/802; B60W 2554/804; B60W 2555/20; B60W 2555/80; B60W 2710/182; B60W 2720/10; B60W 2720/106; G01S 17/08; G01S 17/58; G01S 17/89; G01S 17/931; G01S 13/931; G06F 18/24137; B60Y 2200/147; B60Y 2300/28
USPC ....................................................... 701/24
See application file for complete search history.

(56) References Cited

U.S. PATENT DOCUMENTS

| | | |
|---|---|---|
| 2015/0210312 A1 | 7/2015 | Stein |
| 2016/0098926 A1 | 4/2016 | Probert et al. |
| 2016/0214608 A1 | 7/2016 | Packwood-Ace |
| 2016/0318523 A1 | 11/2016 | Kim |
| 2017/0330455 A1 | 11/2017 | Kikuchi |
| 2018/0037219 A1 | 2/2018 | Johri |
| 2018/0186208 A1 | 7/2018 | Coombs |
| 2019/0071099 A1 | 3/2019 | Nishiguchi |
| 2019/0088135 A1* | 3/2019 | Do .................. B60W 50/14 |
| 2019/0283802 A1 | 9/2019 | Matsunaga et al. |
| 2019/0354105 A1 | 11/2019 | Cunningham |
| 2019/0384994 A1* | 12/2019 | Frossard ............... B60W 50/14 |
| 2020/0078368 A1 | 3/2020 | Yamada et al. |
| 2020/0226924 A1 | 7/2020 | Yeung |
| 2020/0257299 A1 | 8/2020 | Wang et al. |
| 2020/0276972 A1 | 9/2020 | Ito |
| 2020/0324777 A1 | 10/2020 | Kato et al. |
| 2020/0336375 A1* | 10/2020 | Ucar .................... G05D 1/0291 |
| 2020/0353894 A1* | 11/2020 | Obaidi .................. G05D 1/021 |
| 2020/0363800 A1 | 11/2020 | Jojo-Verge |
| 2021/0183246 A1 | 6/2021 | Zack |
| 2021/0245740 A1* | 8/2021 | George ........... B60W 30/18163 |
| 2021/0261133 A1 | 8/2021 | Sakayori et al. |
| 2021/0387622 A1 | 12/2021 | Kudo |
| 2021/0405642 A1 | 12/2021 | Danford |
| 2022/0107197 A1 | 4/2022 | Yeung |
| 2022/0258800 A1 | 8/2022 | Zimmerman |
| 2022/0333933 A1 | 10/2022 | Ma |
| 2022/0371583 A1 | 11/2022 | Kario |
| 2023/0119659 A1* | 4/2023 | Foster .................... G01S 17/931 701/24 |
| 2023/0123611 A1* | 4/2023 | Foster .................... B60W 50/14 701/24 |
| 2023/0123912 A1* | 4/2023 | Foster .................... G01S 17/931 701/23 |
| 2023/0124314 A1* | 4/2023 | Foster ............. B60W 30/18163 701/26 |
| 2023/0222908 A1 | 7/2023 | Yueng |

FOREIGN PATENT DOCUMENTS

| | | |
|---|---|---|
| EP | 2902290 A1 | 8/2015 |
| EP | 3418150 A1 | 12/2018 |
| EP | 3659883 A1 | 6/2020 |
| WO | 2014130178 A1 | 8/2014 |
| WO | 2019009382 A1 | 1/2019 |
| WO | 2022251880 A1 | 12/2022 |

OTHER PUBLICATIONS

International Search Report from corresponding International Application No. PCT/US2022/073241, dated Jan. 2, 2023.
International Search Report & Written Opinion for Application No. PCT/US2022/046646, dated Mar. 30, 2023, 20 pages.
International Search Report & Written Opinion for Application No. PCT/US2022/048289, dated Apr. 28, 2023, 22 pages.
U.S. Patent & Trademark Office, Non-Final Office Action for U.S. Appl. No. 17/661,273, mailed on Mar. 14, 2024, 22 pages.
U.S. Patent & Trademark Office, Non-Final Office Action for U.S. Appl. No. 17/809,543, mailed on Jun. 18, 2024, 21 pages.
U.S. Patent & Trademark Office, Non-Final Office Action for U.S. Appl. No. 17/965,896, mailed on Jul. 17, 2024, 23 pages.
U.S. Patent & Trademark Office, Final Office Action for U.S. Appl. No. 17/661,273, mailed on Aug. 21, 2024, 24 pages.

* cited by examiner

SYSTEMS AND METHODS FOR OPERATING AN AUTONOMOUS VEHICLE

PRIORITY CLAIMS AND RELATED PATENT APPLICATIONS

This patent document claims the priority to and the benefits of U.S. Provisional Application No. 63/255,839 entitled "SYSTEM AND METHOD FOR AN AUTONOMOUS VEHICLE" filed on Oct. 14, 2021. The entire disclosure of the aforementioned application is hereby incorporated by reference as part of the disclosure of this application.

TECHNICAL FIELD

The present disclosure relates generally to autonomous vehicles. More particularly, the present disclosure is related to operating an autonomous vehicle (AV) appropriately on public roads, highways, and locations with other vehicles or pedestrians.

BACKGROUND

One aim of autonomous vehicle technologies is to provide vehicles that can safely navigate towards a destination with limited or no driver assistance. The safe navigation of an autonomous vehicle (AV) from one point to another may include the ability to signal other vehicles, navigating around other vehicles in shoulders or emergency lanes, changing lanes, biasing appropriately in a lane, and navigate all portions or types of highway lanes. Autonomous vehicle technologies may enable an AV to operate without requiring extensive learning or training by surrounding drivers, by ensuring that the AV can operate safely, in a way that is evident, logical, or familiar to surrounding drivers and pedestrians.

SUMMARY

Systems and methods are described herein that can allow an autonomous vehicle to navigate from a first point to a second point. In some embodiments, the AV can navigate from the first point to the second point without a human driver present in the AV and to comply with instructions for safe and lawful operation.

In one exemplary aspect, a method of operating an autonomous vehicle is disclosed. The method includes detecting that a motorcycle is operating on a roadway on which the autonomous vehicle is located. The method further includes classifying a behavior state of the motorcycle based on a location of the motorcycle relative to a split zone that extends between and into two adjacent lanes of the roadway, wherein the behavior state indicates whether the motorcycle is lane splitting. The method further includes determining, based on the behavior state of the motorcycle, a lane permission parameter for the autonomous vehicle that controls whether a given trajectory determined for the autonomous vehicle is permitted to extend into one of the two adjacent lanes. The method further includes causing the autonomous vehicle to operate in accordance with a trajectory that satisfies the lane permission parameter based on transmitting instructions related to the trajectory to one or more subsystems of the autonomous vehicle.

In some embodiments, the given trajectory is determined by a navigation module that is logically downstream of the controller. In some embodiments, the trajectory is configured, based on the behavior state indicating that the motorcycle is lane splitting, to bias the autonomous vehicle within a current lane of the autonomous vehicle away from the location of the motorcycle.

In some embodiments, the split zone extends into each of the two adjacent lanes by a given distance that leaves a width of the autonomous vehicle in the adjacent lane. In some embodiments, the split zone extends into each of the two adjacent lanes by a given distance that is less than half of a width of the adjacent lane. In some embodiments, the split zone extends into each of the two adjacent lanes by a given distance that corresponds to respective widths of the two adjacent lanes and a curvature of the two adjacent lanes.

In some embodiments, the lane permission parameter is determined further based on whether a jurisdiction in which the autonomous vehicle is located permits lane splitting of motorcycles. In some embodiments, causing the autonomous vehicle to operate in accordance with the lane permission parameter includes causing the autonomous vehicle to move from a current lane to a different lane before the autonomous vehicle is within a pre-determined distance from the motorcycle.

In some embodiments, the lane permission parameter is further determined based on whether a jurisdiction within which the autonomous vehicle is located permits lane splitting of motorcycles. In some embodiments, the lane permission parameter does not permit the given trajectory into one of the two adjacent lanes in response to a jurisdiction within which the autonomous vehicle is located not permitting lane splitting of motorcycles. In some embodiments, the lane permission parameter permits the given trajectory into one of the two adjacent lanes in response to a jurisdiction within which the autonomous vehicle is located permitting lane splitting of motorcycles.

In some embodiments, the method further includes, in response to (i) the behavior state indicating that the motorcycle is lane splitting and (ii) a jurisdiction within which the autonomous vehicle is located not permitting lane splitting of motorcycles, automatically indicating an alert to an operator associated with the autonomous vehicle that includes the behavior state of the motorcycle. In some embodiments, the method further includes classifying the motorcycle as a two-wheel motorcycle or a three-wheel motorcycle, and the lane permission parameter is further determined based on the classifying. In some embodiments, the lane permission parameter does not permit the given trajectory to extend into one of the two adjacent lanes based on the motorcycle being a three-wheel motorcycle.

In some embodiments, detecting that the motorcycle is operating on the roadway includes: obtaining a point cloud that captures the motorcycle from one or more light detection and ranging (LiDAR) sensing devices located on the autonomous vehicle, filtering a subset of the point cloud that is attributed to a micro-Doppler effect of wheels of the motorcycle, and determining a bounding box and the location of the motorcycle using the filtered point cloud. In some embodiments, detecting that the motorcycle is operating on the roadway includes: identifying the motorcycle in image data captured by one or more cameras located on the autonomous vehicle, tracking the motorcycle in one or more subsequent sets of image data captured by the one or more cameras, and dynamically updating the location of the motorcycle based on the tracking. In some embodiments, detecting that the motorcycle is operating on the roadway includes: identifying the motorcycle in radar data obtained from one or more radar devices located on the autonomous vehicle, and determining the location of the motorcycle from the radar data. In some embodiments, detecting that the motorcycle is operating on the roadway includes classifying a detected vehicle as a motorcycle due to the detected vehicle having three or fewer wheels.

In some embodiments, the method further includes detecting that a group of motorcycles is operating on the roadway, and the group of motorcycles are each located within a pre-determined distance away from one another and includes the motorcycle. The method further includes determining an aggregate footprint area that surrounds respective locations of the group of motorcycles. The method further includes causing navigation of the autonomous vehicle that both satisfies the lane permission parameter and avoids penetration of the aggregate footprint area.

In another exemplary aspect, a method of operating an autonomous vehicle is disclosed. The method includes detecting that a group of motorcycles is operating on a roadway on which the autonomous vehicle is located, the group of motorcycles being each located within a pre-determined distance away from one another. The method further includes determining an aggregate footprint area that surrounds respective locations of the group of motorcycles. The method further includes causing navigation of the autonomous vehicle that avoids penetration of the aggregate footprint area based on transmitting navigation instructions to one or more subsystems of the autonomous vehicle.

In some embodiments, causing navigation of the autonomous vehicle that avoids penetration of the aggregate footprint area includes determining a trajectory for the autonomous vehicle that maintains a minimum lateral distance away from the aggregate footprint area. In some embodiments, causing navigation of the autonomous vehicle that avoids penetration of the aggregate footprint area includes: associating the aggregate footprint area to one or more particular lanes of the roadway, and restricting the autonomous vehicle from entering the one or more particular lanes of the roadway.

In some embodiments, the method further includes dynamically updating the aggregate footprint area based on whether an individual motorcycle remains within the pre-determined distance away from other motorcycles of the group. In some embodiments, the method further includes dynamically redefining the group of motorcycles in response to an individual motorcycle no longer being located within the pre-determined distance away from other motorcycles of the group. In some embodiments, the method further includes dynamically redefining the group of motorcycles in response to detecting an additional motorcycle that has entered the pre-determined distance away from motorcycles of the group.

In some embodiments, the group of motorcycles is detected based on each of the motorcycles being located within a same lane of the roadway. In some embodiments, the group of motorcycles is detected based on the group of motorcycles each travelling at respective speeds that are within a pre-determined range of each other. In some embodiments, the group of motorcycles is detected based on a line-of-sight extending between two respective motorcycles being unobstructed by another vehicle.

In some embodiments, detecting that the group of motorcycles is operating on the roadway includes: obtaining a point cloud that captures an individual motorcycle from one or more LiDAR sensing devices located on the autonomous vehicle, filtering a subset of the point cloud that is attributed to a micro-Doppler effect of wheels of the individual motorcycle, and determining a bounding box and the location of the individual motorcycle using the filtered point cloud. In some embodiments, detecting that the group of motorcycles is operating on the roadway includes: identifying an individual motorcycle in image data captured by one or more cameras located on the autonomous vehicle, tracking the individual motorcycle in one or more subsequent sets of image data captured by the one or more cameras, and dynamically updating the location of the individual motorcycle based on the tracking. In some embodiments, detecting that the group of motorcycles is operating on the roadway includes: identifying an individual motorcycle in radar data obtained from one or more radar devices located on the autonomous vehicle, and determining the location of the individual motorcycle from the radar data. In some embodiments, detecting that the group of motorcycles is operating on the roadway includes classifying a detected vehicle as an individual motorcycle due to the detected vehicle having three or fewer wheels.

In some embodiments, the method further includes classifying a behavior state of an individual motorcycle based on a location of the individual motorcycle relative to a split zone that extends between and into two adjacent lanes of the roadway, the behavior state indicating whether the motorcycle is lane splitting. The method further includes determining, based on the behavior state of the motorcycle, a lane permission parameter for the autonomous vehicle that controls whether a given trajectory determined for the autonomous vehicle is permitted to extend into one of the two adjacent lanes. The method further includes causing the autonomous vehicle to operate in accordance with a trajectory that both satisfies the lane permission parameter and avoids penetration of the aggregate footprint area.

In yet another exemplary aspect, a method of operating an autonomous vehicle is disclosed. The method includes detecting, via sensor data collected from sensors located on the autonomous vehicle, an upcoming object located on a roadway on which the autonomous vehicle is located. The method further includes determining, from the sensor data, a relative distance and a relative direction of the upcoming object with respect to the autonomous vehicle. The method further includes mapping the upcoming object to an absolute location with respect to the roadway based on (i) map data that describes upcoming topology of the roadway and (ii) a location of the autonomous vehicle within the roadway. The method further includes associating the upcoming object with a lane of the roadway based on the absolute location mapped to the upcoming object and based on lane geometry data for the roadway. The method further includes operating the autonomous vehicle based on a relationship between the lane associated with the upcoming object and a current lane in which the autonomous vehicle is located.

In some embodiments, the method further includes tracking changes to the absolute location of the upcoming object for at least a length of time that the autonomous vehicle is approaching the upcoming object, and updating the lane associated with the upcoming object based on the tracked changes. In some embodiments, the method further includes classifying the upcoming object as a static object or a moving object, and the autonomous vehicle is operated further based on whether the upcoming object is classified as a static object or a moving object. In some embodiments, the method further includes, in response to classifying the upcoming object as a moving object, updating the absolute location of the upcoming object at a pre-determined frequency. In some embodiments, the method further includes, in response to classifying the upcoming object as a static object, monitoring the upcoming object for movement, and based on a threshold degree of movement of the upcoming object being detected, re-classifying the upcoming object as a moving object.

In some embodiments, the method further includes associating the upcoming object with a shoulder area of the roadway based on the lane geometry data defining shoulder areas of the roadway.

In some embodiments, the method further includes determining a size of the upcoming object from the sensor data, and based on the lane associated with the upcoming object and the current lane being a same lane, operating the autonomous vehicle with either a lane change operation or a lane bias operation based on the size of the upcoming object.

In some embodiments, the method further includes tracking the upcoming object across successive sensor data collected from the sensors at subsequent points in time, and updating the lane associated with the upcoming object based on the tracking.

In some embodiments, the method further includes classifying the upcoming object as a vehicular object or a non-vehicular object, and the autonomous vehicle is operated further based on whether the upcoming object is classified as a vehicular object or a non-vehicular object.

In some embodiments, the method further includes, in response to classifying the upcoming object as a vehicular object, updating the absolute location of the upcoming object at a pre-determined frequency.

In some embodiments, the method further includes, in response to classifying the upcoming object as a non-vehicular object, monitoring the upcoming object for movement, and operating the autonomous vehicle to maintain at least a minimum distance away from the upcoming object, wherein the minimum distance corresponds to movement of the upcoming object.

In some embodiments, the lane associated with the upcoming object includes a shoulder area of the roadway.

In some embodiments, the method further includes determining a width of the upcoming object when the autonomous vehicle is a first distance away from the upcoming object, and determining a length of the upcoming object when the autonomous vehicle is a second distance away from the upcoming object. The second distance is less than the first distance, and the autonomous vehicle is operated further based on the width and the length of the upcoming object.

In some embodiments, the method further includes tracking the upcoming object across other sensor data collected from a different set of sensors located on the autonomous vehicle. The different set of sensors are configured for a different sensing modality than the sensors, and the relative distance and the relative direction of the upcoming object is determined further from the other sensor data.

In some embodiments, the method further includes predicting a degree of movement of the upcoming object, and the autonomous vehicle is operated further based on the predicted degree of movement.

In some embodiments, the method further includes updating the absolute location of the upcoming object at a pre-determined frequency that is based on the predicted degree of movement.

In some embodiments, the degree of movement is predicted based on whether or not the upcoming object is a vehicle. In some embodiments, at least a portion of the map data is provided by one or more vehicles located at an upcoming portion of the roadway. In some embodiments, the relative distance and the relative direction of the upcoming object is determined using a centroid of a LiDAR point cloud of the sensor data via which the upcoming object is detected.

In some embodiments, the upcoming object is determined to be a motorcycle, and the autonomous vehicle is navigated according to the upcoming object being a motorcycle.

In yet another exemplary aspect, a method of operating an autonomous vehicle having a trailer coupled to a rear of the autonomous vehicle is disclosed. The method includes continuously predicting a trailer trajectory that is distinct from a planned trajectory of the autonomous vehicle. The method further includes determining that the predicted trailer trajectory is within a minimum avoidance distance away from a stationary vehicle located on a roadway on which the autonomous vehicle is located. The method further includes modifying the planned trajectory of the autonomous vehicle such that the predicted trailer trajectory satisfies the minimum avoidance distance. The method further includes causing the autonomous vehicle to navigate along the modified trajectory based on transmitting instructions to one or more subsystems of the autonomous vehicle.

In some embodiments, modifying the planned trajectory such that the predicted trailer trajectory satisfies the minimum avoidance distance includes iteratively predicting the trailer trajectory using a modified trajectory of the autonomous vehicle until the trailer trajectory satisfies the minimum avoidance distance.

In some embodiments, the trailer trajectory is continuously predicted based on sensor data collected by the controller that indicates an angle of the trailer with respect to a lengthwise axis of the autonomous vehicle. In some embodiments, the trailer trajectory is continuously predicted based on trailer configuration data that includes a length of the trailer and a relative location at which the trailer is coupled to the rear of the autonomous vehicle. In some embodiments, the trailer trajectory is continuously predicted based on and environmental conditions of the roadway and a weight of a trailer load. In some embodiments, the trailer trajectory is continuously predicted based on a curvature of the roadway that is indicated in map data accessible by the controller. In some embodiments, the trailer trajectory is continuously predicted based on a dynamic model of the trailer whose movement is simulated by the controller, and the dynamic model is configured with one of multiple pre-determined weights of trailer load.

In some embodiments, the method further includes determining a target speed of the autonomous vehicle based on the predicted trailer trajectory, and in response to the target speed being lower than a current speed of the autonomous vehicle, causing the autonomous vehicle to reach the target speed using engine braking. In some embodiments, the method further includes determining a target speed of the autonomous vehicle based on the predicted trailer trajectory, and causing the autonomous vehicle to reach the target speed at an acceleration rate that is less than a pre-determined acceleration limit.

In some embodiments, the trailer trajectory is predicted based on a current speed of the autonomous vehicle, and wherein a target speed is determined in connection with the modified trajectory to satisfy the minimum avoidance distance.

In some embodiments, the method further includes continuously predicting a vertical tipping motion of the trailer based on a current speed of the autonomous vehicle, and the planned trajectory is modified to further satisfy a tipping angle limit for the trailer.

In some embodiments, the method further includes determining a likelihood that the stationary vehicle will resume movement, and the minimum avoidance distance is based on the likelihood. In some embodiments, the method further includes predicting a future trajectory of the stationary vehicle, wherein the planned trajectory of the autonomous vehicle is modified such that the predicted trailer trajectory satisfies the minimum avoidance distance with respect to the future trajectory. In some embodiments, the method further includes classifying the stationary vehicle as a normal stationary vehicle or an abnormal stationary vehicle, and the minimum avoidance distance from the stationary vehicle is based on the classifying.

In some embodiments, the method further includes associating the stationary vehicle to a particular lane of the roadway, and the modified trajectory is configured to cause the autonomous vehicle to travel to a different lane of the roadway than the particular lane. In some embodiments, the modified trajectory includes a lane change in response to the stationary vehicle being located in a same lane as the autonomous vehicle. In some embodiments, the modified trajectory includes a complete stop based on a failure to predict a trailer trajectory that navigates around the stationary vehicle while satisfying the minimum avoidance distance away from the stationary vehicle. In some embodiments, the modified trajectory includes a complete stop based on the stationary vehicle occupying all lanes of the roadway.

In some embodiments, the modified trajectory satisfies a lane permission parameter that is determined based on one or more motorcycles operating on the roadway. In some embodiments, the modified trajectory avoids penetration of an aggregate footprint area that surrounds respective locations of a group of motorcycles that are operating on the roadway.

In yet another exemplary aspect, a system for operating an autonomous vehicle, comprising a computer that includes a processor configured to perform the methods or operations described in this patent document.

In yet another exemplary aspect, the methods or operations described in this patent document are embodied in a non-transitory computer readable storage medium. The non-transitory computer readable storage medium includes code that when executed by a processor, causes the processor to perform the methods described in this patent document.

In another exemplary embodiment, a device that is configured or operable to perform the methods or operations described herein is disclosed. In yet another exemplary embodiment, a system comprises a computer located in a vehicle, the computer comprises a processor configured to implement the methods described herein is disclosed.

The above and other aspects and their implementations are described in greater detail in the drawings, the descriptions, and the claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

FIG. 4 shows an exemplary block diagram of a remote computer associated with an oversight system, a control tower, a control center, and/or the like.

DETAILED DESCRIPTION

Vehicles traversing highways and roadways are legally required to comply with regulations and statutes in the course of safe operation of the vehicle. For autonomous vehicles (AVs), particularly autonomous tractor trailers, the ability to recognize a malfunction in its systems and stop safely can allow for a lawful and safe operation of the vehicle. Described below in detail are systems and methods for the safe and lawful operation of an autonomous vehicle on a roadway, including the execution of maneuvers that bring the autonomous vehicle in compliance with the law while signaling surrounding vehicles of its condition.

This patent document describes in Section I below an example vehicle ecosystem of an autonomous vehicle and driving-related operations of the autonomous vehicle. Section II describes a control center or oversight system for one or more autonomous vehicles, as well as various example features thereof, and operations/processes performed thereby. Sections III to VII describe example operations related to particular aspects of driving-related operations of the autonomous vehicle. The example headings for the various sections below are used to facilitate the understanding of the disclosed subject matter and do not limit the scope of the claimed subject matter in any way. Accordingly, one or more features of one example section can be combined with one or more features of another example section.

This patent document uses many abbreviations and uncommon terms. For instance, "GNSS" or "GPS" may refer to satellite navigation systems; when referring to an emergency vehicle, such as a police vehicle, ambulance, fire truck, tow truck, and the like, the abbreviation "EV" may be used; the acronym "TTC" indicates "time to collision"; "NPC" refers to non-player characters and may include any other vehicle that is not the autonomous vehicle in FIG. 1. For example, any surrounding vehicle, motorcycle, bicycle, and the like that are manually driven or autonomously driven and that may not be in communication with the autonomous vehicle may be considered NPC; a "k-ramp" denotes a freeway on/off ramp of a particular configuration; "STV" indicates a stopped vehicle; "ELV" may indicate an end-of-life or disabled vehicle, such as a disabled vehicle on a roadside; "OBO" may refer to an on-board operator or a human operator of an autonomous vehicle who temporarily takes control to assist during inspections, start-up, and/or ending of a trip or mission for the autonomous vehicle; and "LC" may be an abbreviation for lane change.

I. Example Ecosystem of an Autonomous Vehicle

Figure 1:
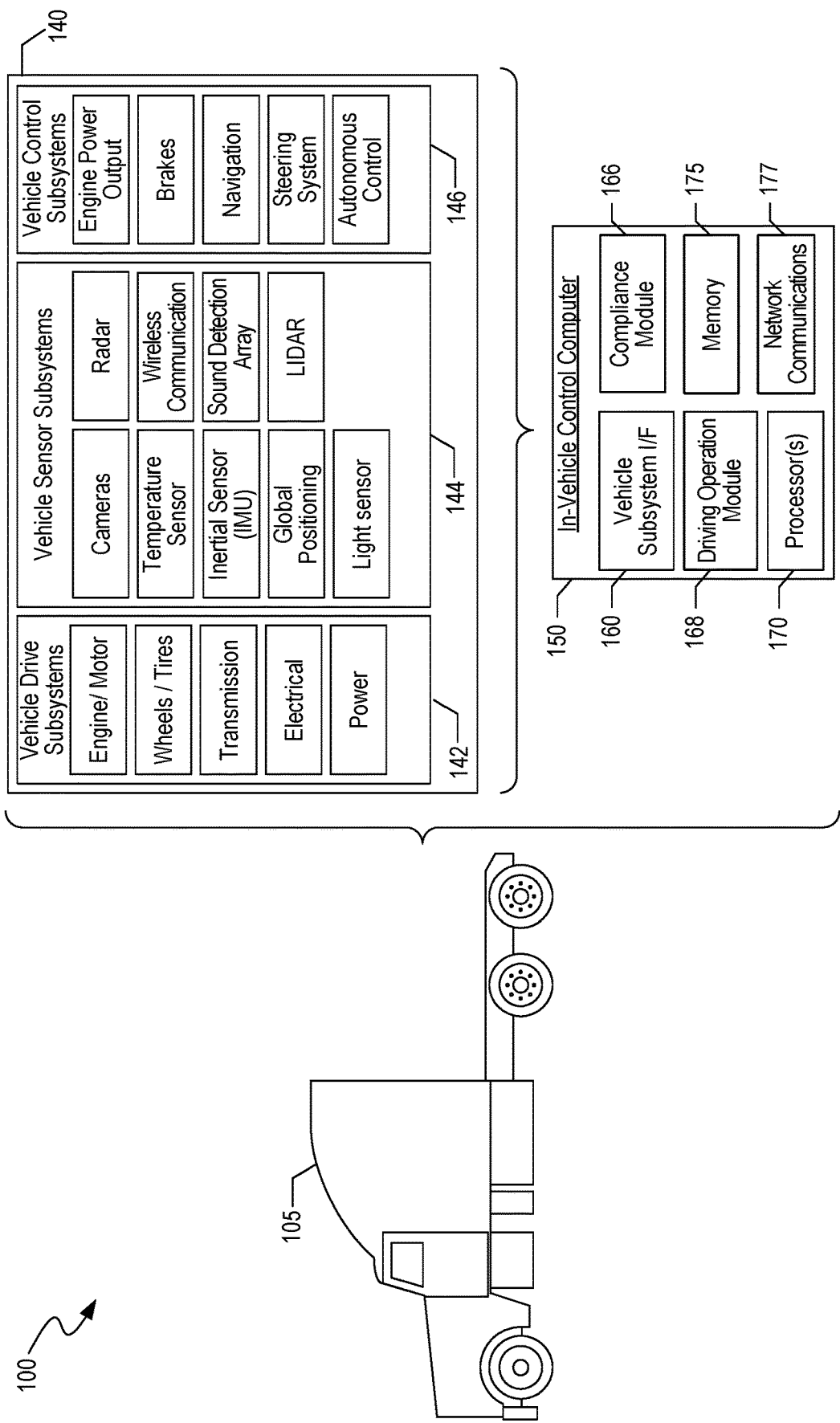
FIG. 1 illustrates a block diagram of an example vehicle ecosystem of an autonomous vehicle.

FIG. 1 shows a system 100 that includes an autonomous vehicle 105. The autonomous vehicle 105 may include a tractor of a semi-trailer truck. The autonomous vehicle 105 includes a plurality of vehicle subsystems 140 and an in-vehicle control computer 150. The plurality of vehicle subsystems 140 includes vehicle drive subsystems 142, vehicle sensor subsystems 144, and vehicle control subsystems 146. An engine or motor, wheels and tires, a transmission, an electrical subsystem, and a power subsystem may be included in the vehicle drive subsystems. The engine of the autonomous truck may be an internal combustion engine, a fuel-cell powered electric engine, a battery powered electrical engine, a hybrid engine, or any other type of engine capable of moving the wheels on which the autonomous vehicle 105 moves. The autonomous vehicle 105 may have multiple motors or actuators to drive the wheels of the vehicle, such that the vehicle drive subsystems 142 include two or more electrically driven motors. The transmission may include a continuous variable transmission or a set number of gears that translate the power created by the engine into a force that drives the wheels of the vehicle. The vehicle drive subsystems may include an electrical system that monitors and controls the distribution of electrical current to components within the system, including pumps, fans, and actuators. The power subsystem of the vehicle drive subsystems may include components that regulate the power source of the vehicle.

Vehicle sensor subsystems 144 can include sensors for general operation of the autonomous vehicle 105, including those which would indicate a malfunction in the autonomous vehicle or another cause for an autonomous vehicle to perform a limited or minimal risk condition (MRC) maneuver or an emergency driving maneuver. A driving operation module (shown as 168 in FIG. 1) can perform an MRC maneuver by sending instructions that cause the autonomous vehicle to steer along a trajectory to a side of the road and to apply brakes so that the autonomous vehicle can be safely stopped to the side of the road. The sensors for general operation of the autonomous vehicle may include cameras, a temperature sensor, an inertial sensor (IMU), a global positioning system, a light sensor, a LIDAR/LiDAR system, a radar system, and wireless communications.

A sound detection array, such as a microphone or array of microphones, may be included in the vehicle sensor subsystem 144. The microphones of the sound detection array are configured to receive audio indications of the presence of, or instructions from, authorities, including sirens and command such as "Pull over." These microphones are mounted, or located, on the external portion of the vehicle, specifically on the outside of the tractor portion of an autonomous vehicle 105. The microphones may be any suitable type, mounted such that they are effective both when the autonomous vehicle 105 is at rest, as well as when it is moving at driving speeds.

Cameras included in the vehicle sensor subsystems 144 may be rear facing, forward facing, and/or provide side views of the autonomous vehicle 105 so that lights from emergency vehicles may be observed from all around the autonomous vehicle 105. These cameras may include video cameras, cameras with filters for specific wavelengths, as well as other cameras suitable to detect emergency vehicle lights based on color, flashing, or of both color and flashing.

The vehicle control subsystems 146 may be configured to control operation of the autonomous vehicle, or truck, 105 and its components. Accordingly, the vehicle control subsystems 146 may include various elements such as an engine power output subsystem, a brakes unit, a navigation unit, a steering system, and an autonomous control unit. The engine power output may control the operation of the engine, including the torque produced or horsepower provided, as well as provide control the gear selection of the transmission. The brakes unit can include any combination of mechanisms configured to decelerate the autonomous vehicle 105. The brakes unit can use friction to slow the wheels in a standard manner. The brakes unit may include an Anti-lock brake system (ABS) that can prevent the brakes from locking up when the brakes are applied. The navigation unit may be any system configured to determine a driving path or route for the autonomous vehicle 105. The navigation unit may additionally be configured to update the driving path dynamically while the autonomous vehicle 105 is in operation. In some embodiments, the navigation unit may be configured to incorporate data from the GPS device and one or more pre-determined maps so as to determine the driving path for the autonomous vehicle 105. The steering system may represent any combination of mechanisms that may be operable to adjust the heading of autonomous vehicle 105 in an autonomous mode or in a driver-controlled mode.

The autonomous control unit may represent a control system configured to identify, evaluate, and avoid or otherwise negotiate potential obstacles in the environment of the autonomous vehicle 105. In general, the autonomous control unit may be configured to control the autonomous vehicle 105 for operation without a driver or to provide driver assistance in controlling the autonomous vehicle 105. In some embodiments, the autonomous control unit may be configured to incorporate data from the GPS device, the RADAR, the LiDAR, the cameras, and/or other vehicle subsystems to determine the driving path or trajectory for the autonomous vehicle 105. The autonomous control may activate systems of the autonomous vehicle 105, which may not be present in a conventional vehicle, including those systems which can allow an autonomous vehicle to communicate with surrounding drivers or signal surrounding vehicles or drivers for safe operation of the autonomous vehicle.

An in-vehicle control computer 150, which may be referred to as a VCU, includes a vehicle subsystem interface 160, a driving operation module 168, one or more processors 170, a compliance module 166, a memory 175, and a network communications subsystem 177. This in-vehicle control computer 150 controls many, if not all, of the operations of the autonomous vehicle 105 in response to information from the various vehicle subsystems 140. The one or more processors 170 execute the operations that allow the system to determine the health/status of the autonomous vehicle, such as whether the autonomous vehicle has a malfunction or has encountered a situation requiring service or a deviation from normal operation and giving instructions. Data from the vehicle sensor subsystems 144 is provided to VCU 150 so that the determination of the status of the autonomous vehicle can be made. The compliance module 166 determines what action should be taken by the autonomous vehicle 105 to operate according to the applicable (e.g., local) regulations. Data from the vehicle sensor subsystems 144 may be provided to the compliance module 166 so that the best course of action in light of the autonomous vehicle's status may be appropriately determined and performed. Alternatively, or additionally, the compliance module 166 may determine the course of action in conjunction with another operational or control module, such as the driving operation module 168.

The memory 175 may contain additional instructions as well, including instructions to transmit data to, receive data from, interact with, or control one or more of the vehicle drive subsystems 142, the vehicle sensor subsystems 144, and the vehicle control subsystems 146 including the autonomous Control system. The in-vehicle control computer (VCU) 150 may control the function of the autonomous vehicle 105 based on inputs received from various vehicle subsystems (e.g., the vehicle drive subsystems 142, the vehicle sensor subsystems 144, and the vehicle control subsystems 146). Additionally, the VCU 150 may send information to the vehicle control subsystems 146 to direct the trajectory, velocity, signaling behaviors, and the like, of the autonomous vehicle 105. For example, compliance module 166 and/or the driving operation module 168 in the VCU 150 may send instructions to one or more devices of the autonomous vehicle 105. The one or more devices may include one or more devices in the vehicle drive subsystems 142, the vehicle sensor subsystems 144, or the vehicle control subsystems 146. These instructions sent by the VCU 150 to one or more devices in the autonomous vehicle 105 are configured to effectuate and result in certain operations and actions being performed by the one or more devices in accordance with the instructions. Operations resulting from the instructions being sent to the one or more devices may together form driving related operations performed by the autonomous vehicle 105. For example, the VCU 150 may send instructions to a motor in the steering system, to an actuator in a brake unit, and/or to the engine to cause one or more devices to operate in accordance with the instructions such that the autonomous vehicle 105 performs a maneuver, or steers to follow a trajectory at a specified (e.g., via the instructions) velocity and/or acceleration/deceleration. Thus, the instructions provided by the VCU 150 can allow the autonomous vehicle 105 to follow a trajectory to steer from a current lane in which the autonomous vehicle 105 is operating to an adjacent lane or to a shoulder area (e.g., emergency stopping lane or area on side of the roadway) on the roadway. The autonomous control vehicle control subsystem may receive a course of action to be taken from the compliance module 166 of the VCU 150 and consequently relay instructions to other subsystems to execute the course of action. In Sections III to VII below, this patent document describes that the autonomous vehicle or a system performs certain functions or operations. These functions and/or the operations described can be performed by the compliance module 166 and/or the driving operation module 168.

Figure 2:
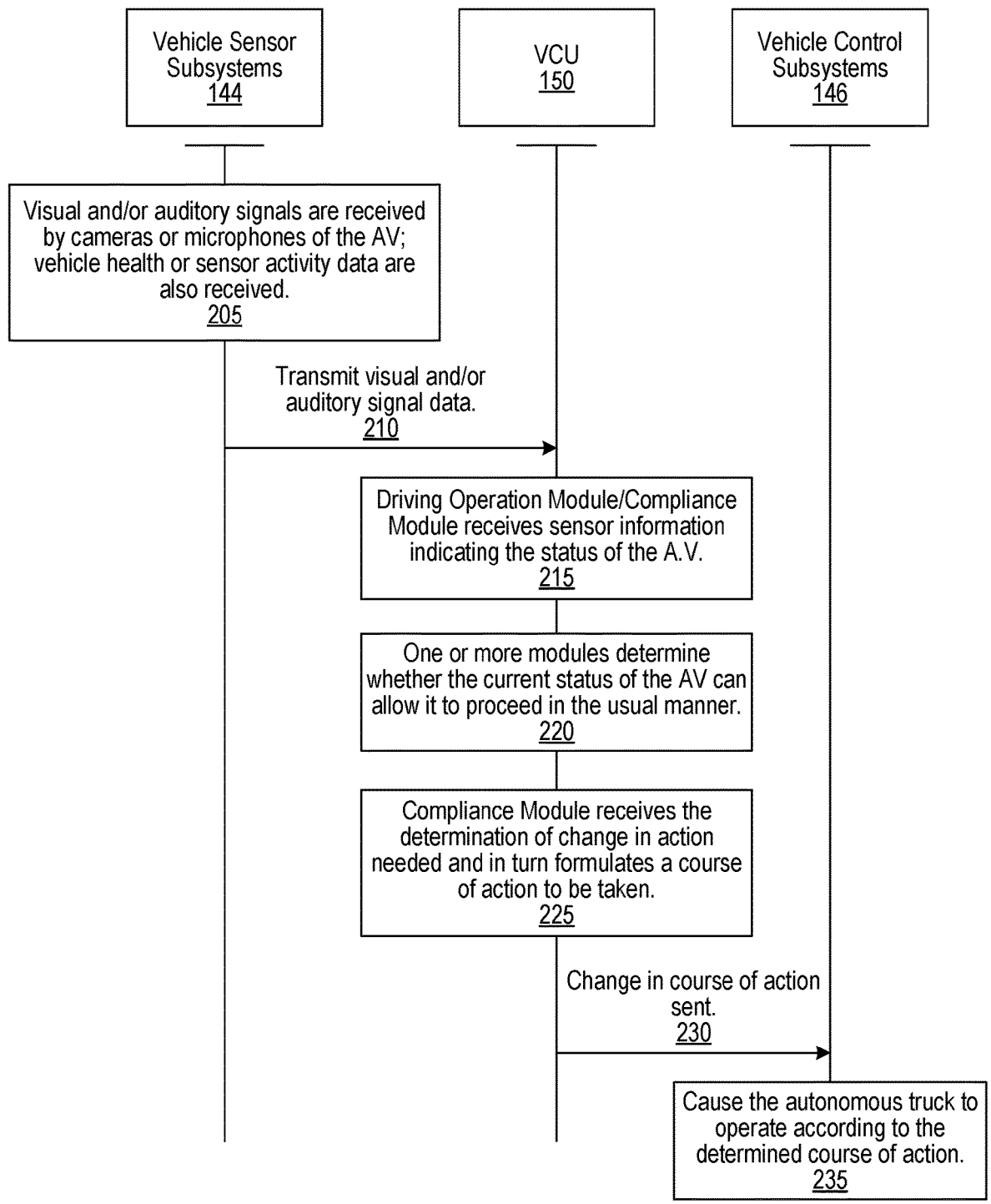
FIG. 2 shows a flow diagram for safe operation of an autonomous vehicle safely in light of the health and/or surroundings of the autonomous vehicle.

FIG. 2 shows a flow diagram for safe operation of an autonomous vehicle safely in light of the health and/or surroundings of the autonomous vehicle. Although this figure depicts functional processes in a particular order for purposes of illustration, the processes are not limited to any particular order or arrangement. One skilled in the relevant art will appreciate that the various steps portrayed in this figure may be omitted, rearranged, combined and/or adapted in various ways.

As shown in FIG. 2, the vehicle sensor subsystems 144 receives visual, auditory, or both visual and auditory signals indicating the at the environmental condition of the autonomous vehicle, as well as vehicle health or sensor activity data are received in operation 205. These visual and/or auditory signal data are transmitted from the vehicle sensor subsystems 144 to the in-vehicle control computer system (VCU) 150, as in operation 210. Any of the driving operation module and the compliance module receive the data transmitted from the vehicle sensor subsystems, in operation 215. Then, one or both of those modules determine whether the current status of the autonomous vehicle can allow it to proceed in the usual manner or that the autonomous vehicle needs to alter its course to prevent damage or injury or to allow for service in operation 220. The information indicating that a change to the course of the autonomous vehicle is needed may include an indicator of sensor malfunction; an indicator of a malfunction in the engine, brakes, or other components that may be necessary for the operation of the autonomous vehicle; a determination of a visual instruction from authorities such as flares, cones, or signage; a determination of authority personnel present on the roadway; a determination of a law enforcement vehicle on the roadway approaching the autonomous vehicle, including from which direction; and a determination of a law enforcement or first responder vehicle moving away from or on a separate roadway from the autonomous vehicle. This information indicating that a change to the autonomous vehicle's course of action or driving related operation is needed may be used by the compliance module to formulate a new course of action to be taken which accounts for the autonomous vehicle's health and surroundings, in operation 225. The course of action to be taken may include slowing, stopping, moving into a shoulder, changing route, changing lane while staying on the same general route, and the like. The course of action to be taken may include initiating communications with any oversight or human interaction systems present on the autonomous vehicle. The course of action to be taken may then be transmitted from the VCU 150 to the autonomous control system, in operation 230. The vehicle control subsystems 146 then cause the autonomous vehicle 105 to operate in accordance with the course of action to be taken that was received from the VCU 150 in operation 235.

It should be understood that the specific order or hierarchy in the processes disclosed herein is an example of exemplary approaches. Based upon design preferences, it is understood that the specific order or hierarchy in the processes may be rearranged while remaining within the scope of the present disclosure. The accompanying method claims present elements of the various processes in a sample order and are not meant to be limited to the specific order or hierarchy presented.

II. Autonomous Truck Oversight System

Figure 3:
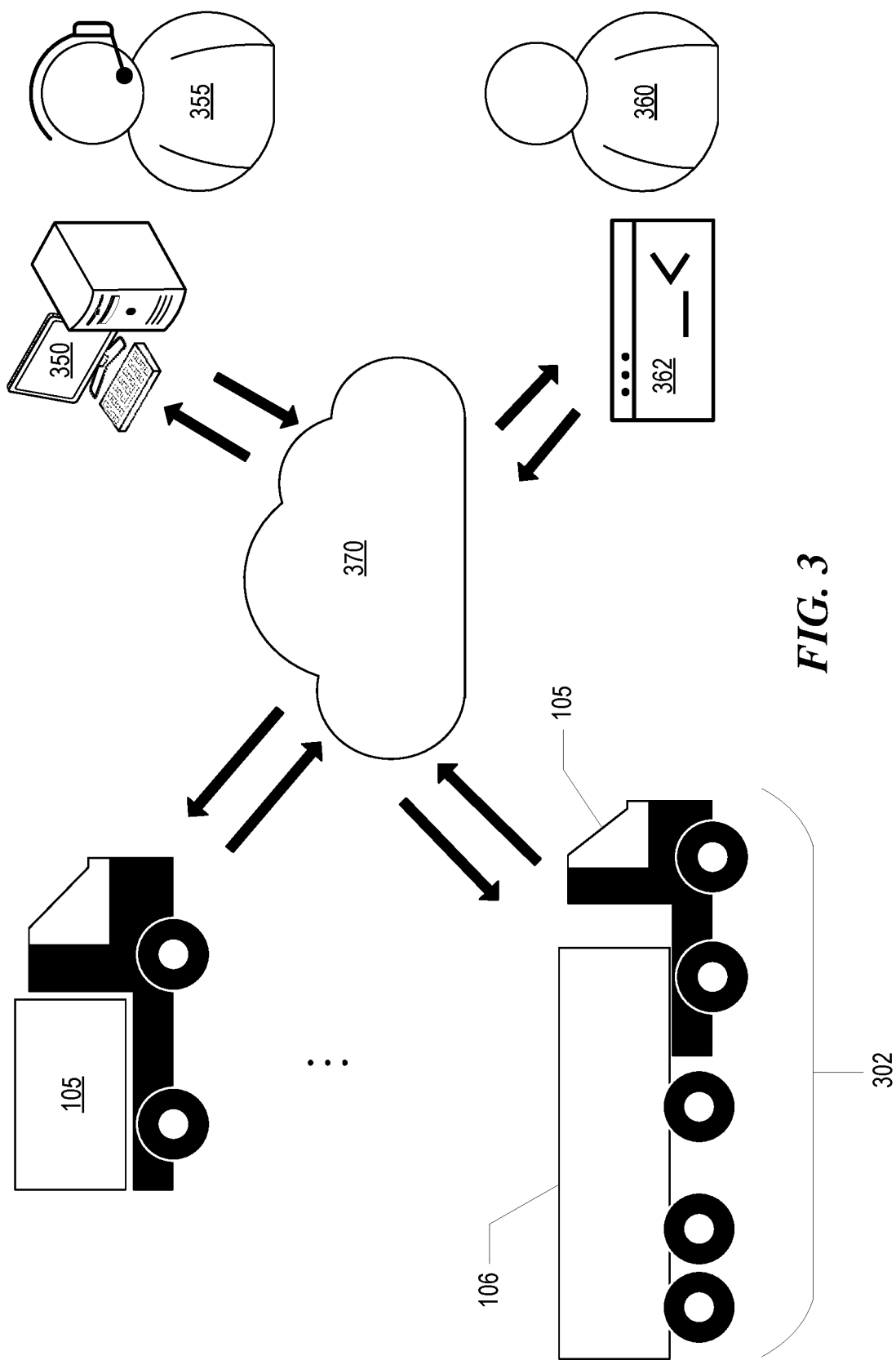
FIG. 3 illustrates a system that includes one or more autonomous vehicles, a control center or oversight system with a human operator (e.g., a remote center operator (RCO)), and an interface for third-party interaction.

FIG. 3 illustrates a system that includes one or more autonomous vehicles 105, a control center or oversight system 350 with a human operator 355, and an interface 362 for third-party 360 interaction. In some examples, an autonomous vehicle 105 is a tractor to which a trailer 106 is coupled or connected. In particular, the trailer 106 is coupled to a rear of the autonomous vehicle 105 such that the autonomous vehicle 105 can transport the trailer 106. The combination of the tractor and the trailer 106 can also be understood as an autonomous vehicle 302 for the purposes of the present disclosure. Thus, the autonomous vehicle 302 may refer to an autonomous vehicle that may or may not include a trailer 106. In the present disclosure, references to an autonomous vehicle 302 and an autonomous vehicle 105 may be interchangeable, in some examples, and in other examples, explicit reference to a trailer of an autonomous vehicle may be made.

A human operator 355 may also be known as a remoter center operator (RCO). Communications between the autonomous vehicles 302, oversight system 350 and user interface 362 take place over a network 370. In some instances, where not all the autonomous vehicles 302 in a fleet are able to communicate with the oversight system 350, the autonomous vehicles 302 may communicate with each other over the network 370 or directly with each other via an ad-hoc communication link. As described with respect to FIG. 1, the VCU 150 of each autonomous vehicle 302 may include a network communications subsystem 177.

An autonomous truck may be in communication with an oversight system. The oversight system may serve many purposes, including: tracking the progress of one or more autonomous vehicles (e.g., an autonomous truck); tracking the progress of a fleet of autonomous vehicles; sending maneuvering instructions to one or more autonomous vehicles; monitoring the health of the autonomous vehicle(s); monitoring the status of the cargo of each autonomous vehicle in contact with the oversight system; facilitate communications between third parties (e.g., law enforcement, clients whose cargo is being carried) and each, or a specific, autonomous vehicle; allow for tracking of specific autonomous trucks in communication with the oversight system (e.g., third-party tracking of a subset of vehicles in a fleet); arranging maintenance service for the autonomous vehicles (e.g., oil changing, fueling, maintaining the levels of other fluids); alerting an affected autonomous vehicle of changes in traffic or weather that may adversely impact a route or delivery plan; pushing over the air updates to autonomous trucks to keep all components up to date; and other purposes or functions that improve the safety for the autonomous vehicle, its cargo, and its surroundings. An oversight system may also determine performance parameters of an autonomous vehicle or autonomous truck, including any of: data logging frequency, compression rate, location, data type; communication prioritization; how frequently to service the autonomous vehicle (e.g., how many miles between services); when to perform a minimal risk condition (MRC) maneuver while monitoring the vehicle's progress during the maneuver; when to hand over control of the autonomous vehicle to a human driver (e.g., at a destination yard); ensuring an autonomous vehicle passes a pre-trip inspection; ensuring an autonomous vehicle performs or conforms to legal requirements at checkpoints and weight stations; ensuring an autonomous vehicle performs or conforms to instructions from a human at the site of a roadblock, cross-walk, intersection, construction, or accident; and the like.

Included in some of the functions executed by an oversight system or command center is the ability to relay over-the-air, real-time weather updates to autonomous vehicles in a monitored fleet. The over-the-air weather updates may be pushed to all autonomous vehicles in the fleet or may be pushed only to autonomous vehicles currently on a mission to deliver a cargo. Alternatively, or additionally, priority to push or transmit over-the-air weather reports may be given to fleet vehicles currently on a trajectory or route that leads towards or within a pre-determined radius of a weather event.

Another function that may be encompassed by the functions executed by an oversight system or command center is the transmission of trailer metadata to the autonomous vehicle's computing unit (VCU) prior to the start of a cargo transport mission. The trailer metadata may include the type of cargo being transmitted, the weight of the cargo, temperature thresholds for the cargo (e.g., trailer interior temperature should not fall below or rise above pre-determined temperatures), time-sensitivities, acceleration/deceleration sensitivities (e.g., jerking motion may be bad because of the fragility of the cargo), trailer weight distribution along the length of the trailer, cargo packing or stacking within the trailer, and the like.

An oversight system or command center may be operated by one or more human, also known as an operator or a remote center operator (RCO). The operator may set thresholds for autonomous vehicle health parameters, so that when an autonomous vehicle meets or exceeds a threshold, a precautionary action may be taken. Examples of vehicle health parameters for which thresholds may be established by an operator may include any of: fuel levels; oil levels; miles traveled since last maintenance; low tire-pressure detected; cleaning fluid levels; brake fluid levels; responsiveness of steering and braking subsystems; Diesel exhaust fluid (DEF) level; communication ability (e.g., lack of responsiveness); positioning sensors ability (e.g., GPS, IMU malfunction); impact detection (e.g., vehicle collision); perception sensor ability (e.g., camera, LIDAR, radar, microphone array malfunction); computing resources ability (e.g., VCU or ECU malfunction or lack of responsiveness, temperature abnormalities in computing units); angle between a tractor and trailer in a towing situation (e.g., tractor-trailer, 18-wheeler, or semi-truck); unauthorized access by a living entity (e.g., a person or an animal) to the interior of an autonomous truck; and the like. The precautionary action may include execution of a minimal risk condition (MRC) maneuver, seeking service, or exiting a highway or other such re-routing that may be less taxing on the autonomous vehicle. An autonomous vehicle whose system health data meets or exceeds a threshold set at the oversight system or by the operator may receive instructions that are automatically sent from the oversight system to perform the precautionary action.

The operator may be made aware of situations affecting one or more autonomous vehicles in communication with or being monitored by the oversight system that the affected autonomous vehicle(s) may not be aware of. Such situations may include: irregular or sudden changes in traffic flow (e.g., traffic jam or accident); abrupt weather changes; abrupt changes in visibility; emergency conditions (e.g., fire, sinkhole, bridge failure); a power outage affecting signal lights; an unexpected road work; large or ambiguous road debris (e.g., object unidentifiable by the autonomous vehicle); law enforcement activity on the roadway (e.g., car chase or road clearing activity); and the like. These types of situations that may not be detectable by an autonomous vehicle may be brought to the attention of the oversight system operator through traffic reports, law enforcement communications, data from other vehicles that are in communication with the oversight system, reports from drivers of other vehicles in the area, and similar distributed information venues. An autonomous vehicle may not be able to detect such situations because of limitations of sensor systems or lack of access to the information distribution means (e.g., no direct communication with a weather agency). An operator at the oversight system may push such information to affected autonomous vehicles that are in communication with the oversight system. The affected autonomous vehicles may proceed to alter their route, trajectory, or speed in response to the information pushed from the oversight system. In some instances, the information received by the oversight system may trigger a threshold condition indicating that MRC (minimal risk condition) maneuvers are warranted; alternatively, or additionally, an operator may evaluate a situation and determine that an affected autonomous vehicle should perform an MRC maneuver and subsequently send such instructions to the affected vehicle. In these cases, each autonomous vehicle receiving either information or instructions from the oversight system or the oversight system operator may use its on-board computing unit (e.g., VCU) to determine how to safely proceed, including performing an MRC maneuver that includes pulling-over or stopping.

Other interactions that the remote center operator (RCO) may have with an autonomous vehicle or a fleet of autonomous vehicles includes any of the following: pre-planned event avoidance; real-time route information updates; real-time route feedback; trail hookup status; first responder communication request handling; notification of aggressive surrounding vehicle(s); identification of construction zone changes; status of an autonomous vehicle with respect to its operational design domain (ODD), such as alerting the RCO when an autonomous vehicle is close to or enters a status out of ODD; RCO notification of when an autonomous vehicle is within a threshold distance from a toll booth and appropriate instruction/communication with the autonomous vehicle or toll authority may be sent to allow the autonomous vehicle to bypass the toll; RCO notification of when an autonomous vehicle bypasses a toll; RCO notification of when an autonomous vehicle is within a threshold distance from a weigh station and appropriate instruction/communication with the autonomous vehicle or appropriate authority may be sent to allow the autonomous vehicle to bypass the weigh station; RCO notification of when an autonomous vehicle bypasses a weigh station; notification to the autonomous vehicle from the RCO regarding scheduling or the need for fueling or maintenance; RCO authorization of third-party access to an autonomous vehicle cab; ability of an RCO to start/restart an autonomous driving system (ADS) on a vehicle; ability of an administrator (possibly an RCO) to set roles for system users, including ground crew, law enforcement, and third parties (e.g., customers, owners of the cargo); support from an RCO for communication with a service maintenance system with fleet vehicles; notification to the RCO from an autonomous vehicle of acceleration events; instruction from an RCO to an autonomous vehicle to continue its mission even when communication is interrupted; RCO monitoring of an autonomous vehicle during and after an MRC maneuver is executed; support for continuous communication between an autonomous vehicle and a yard operator at a facility where the autonomous vehicle is preparing to begin a mission or where the autonomous vehicle is expected to arrive; oversight system monitoring of software systems on an autonomous vehicle and oversight system receiving alerts when software systems are compromised; and the like.

An oversight system or command center may allow a third party to interact with the oversight system operator, with an autonomous truck, or with both the human system operator and an autonomous truck. A third party may be a customer whose goods are being transported, a law enforcement or emergency services provider, or a person assisting the autonomous truck when service is needed. In its interaction with a third party, the oversight system may recognize different levels of access, such that a customer concerned about the timing or progress of a shipment may only be allowed to view status updates for an autonomous truck, or may be able to view status and provide input regarding what parameters to prioritize (e.g., speed, economy, maintaining originally planned route) to the oversight system. By providing input regarding parameter prioritization to the oversight system, a customer can influence the route and/or operating parameters of the autonomous truck.

Actions that an autonomous vehicle, particularly an autonomous truck, as described herein may be configured to execute to safely traverse a course while abiding by the applicable rules, laws, and regulations may include those actions successfully accomplished by an autonomous truck driven by a human. These actions, or maneuvers, may be described as features of the truck, in that these actions may be executable programming stored on the VCU 150 (the in-vehicle control computer unit). For example, the VCU 150 performs operations including those related to reactions to the detection of certain types of conditions or objects such as: appropriate motion on hills; appropriate motion on curved roads, appropriate motion at highway exits; appropriate motion or action in response to: detecting one or more stopped vehicle, detecting one or more vehicles in an emergency lane; detecting an emergency vehicle with flashing lights that may be approaching the autonomous vehicle; motion in response to detecting one or more large vehicles approaching, adjacent to, or soon, to be adjacent to the autonomous vehicle; motions or actions in response to pedestrians, bicyclists, and the like after identification and classification of such actors (e.g., by the VCU 150); motions or actions in response to curved or banked portions of the roadway; and/or motions in response to identifying on and off ramps on highways or freeways, encountering an intersection; execution of a merge into traffic in an adjacent lane or area of traffic; detection of a need to clean one or more sensors and the cleaning of the appropriate sensor(s); identification of law enforcement/emergency vehicles and personnel and compliance with associated instructions or regulations; execution of minimal risk condition maneuvers when needed; and identification of road debris or unknown objects; and the like. Other features of an autonomous truck may include those actions or features which are needed for any type of maneuvering, including that needed to accomplish the features or actions that are reactionary, listed above.

Supporting features may include: changing lanes safely; operating turn signals on the autonomous truck to alert other drivers of intended changes in motion; biasing the autonomous truck in its lane (e.g., moving away from the center of the lane to accommodate the motions or sizes of neighboring vehicles or close objects); ability to maintain an appropriate following distance; the ability to turn right and left with appropriate signaling and motion, and the like. Supporting features may also include: the ability to navigate roundabouts; the ability to properly illuminate with on-vehicle lights as-needed for ambient light and for compliance with local laws; apply the minimum amount of deceleration needed for any given action; determine location at all times; adapting dynamic vehicle control for trailer load distributions, excluding wheel adjustment; launching (reaching target speed), accelerating, stopping, and yielding; operate on roadways with bumps and potholes; enter a minimal risk condition (MRC) on roadway shoulders; access local laws and regulations based on location along a route; operate on asphalt, concrete, mixed grading, scraped road, and gravel;

ability to operate in response to metering lights/signals at on-ramps; operate on a roadway with a width up to a pre-determined width; able to stop at crosswalks with sufficient stopping distance; navigate two-way left turn lanes; operate on roadways with entry and exit ramps; utilize the vehicle horn to communicate with other drivers; and the like. One or more features and/or one or more supporting features described in this patent document may combined and can be performed by the in-vehicle control computer in an autonomous truck.

In some embodiments, the actions or features may be considered supporting features and may include: speed control; the ability to maintain a straight path; and the like. These supporting features, as well as the reactionary features listed above, may include controlling or altering the steering, engine power output, brakes, or other vehicle control subsystems 146. The reactionary features and supporting features listed above are discussed in greater detail below.

As described above, an autonomous vehicle may be in communication with an oversight system which may serve various purposes related to the operation of the autonomous vehicle, such as but not limited to monitoring and/or triggering MRC fault conditions.

Figure 4:
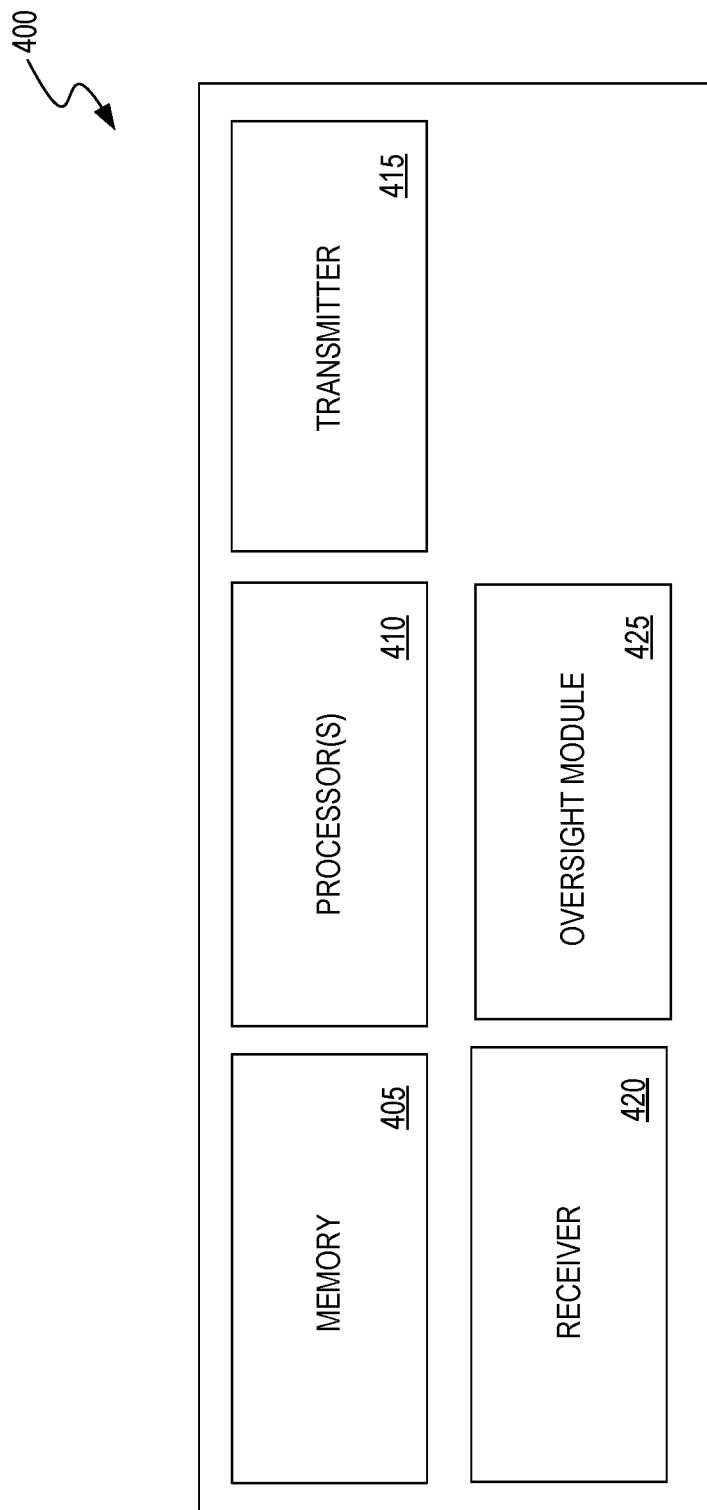

FIG. 4 shows an exemplary block diagram of a remote computer 400 associated with an oversight system. The oversight system (shown as 350 in FIG. 3) may include the remote computer 400 which can be located at a location outside of an autonomous vehicle. In this patent document, the descriptions related to operations performed by the oversight system can be performed by the oversight module (shown as 425 in FIG. 4) in the remote computer 400. The remote computer 400 includes at least one processor 410 and a memory 405 having instructions stored thereupon. The instructions, upon execution by the processor 410, configure the remote computer 400 to perform the operations related to the oversight module 425, where the oversight module 425 can perform operations related to the oversight system as described at least in FIGS. 1 to 3 and in the various embodiments described in this patent document. A remote computer 400 may include one or more servers. The transmitter 415 transmits or sends information or data to one or more autonomous vehicles, and the receiver 420 receives information or data from one or more autonomous vehicles. According to various embodiments, the information or data transmitted to and received from one or more autonomous vehicles may include communications, operations, processes, and the like described herein.

It will be understood that, in some embodiments, the remote computer 400 may be a cloud computing platform or a multi-processor platform. For example, the processor 410 includes a plurality of processors. As such, in some embodiments, the remote computer 400 includes a plurality of computing devices that may be located at different locations and that cooperate to perform functionalities associated with the remote computer 400.

III. Detection and Handling for Motorcycles

An autonomous vehicle may encounter motorcycles that operate on a roadway on which the autonomous vehicle is located. Motorcycles are characterized by a narrower width compared to other vehicles, which results in motorcycles being operated in a different manner than other vehicles. For example, in some jurisdictions or regions, such as California, motorcycles are permitted to lane split (also known as lane straddling or other terms). Lane splitting may generally refer to a motorcycle or similar vehicle (e.g., a bicycle, a scooter) to travel between lanes of a roadway, for example, tracing along a lane boundary. In some examples, motorcycles travel together in groups or convoys. To provide safe operation of an autonomous vehicle, the autonomous vehicle needs to detect and appropriately handle motorcycles and all the behaviors thereof.

III.(a) Motorcycle Definition

An autonomous vehicle may define motorcycle as a motor vehicle with motive power having a seat or saddle for the use of the rider and designed to travel on not more than three wheels with the wheel rim diameter of at least 10 inches in contact with ground.

Motorcycles include motor scooters, mopeds, motor-powered bicycles, and three-wheel motorcycles.

An autonomous vehicle may categorize motorcycles in different groups as 2-wheel motorcycles and 3-wheel motorcycles, since this affects the maneuver capabilities.

III.(b) Group of Motorcycles Definition

An autonomous vehicle may define a group of motorcycles as three or more motorcycles driving in the same lane; if they are no more than a predetermined distance away from each other (e.g., at most 30 m, at most 40 m, at most 50 m, at most 60 m, at most 70 m) and there are no other types of vehicles in between. For example, lines-of-sight between motorcycles are determined, and intersection or obstructions of such lines-of-sight by other vehicles are detected. In some examples, an autonomous vehicle defines a group of motorcycles as three or more motorcycles no more than a predetermined distance away from each other and traveling at approximately the same speed.

III.(c) Motorcycle Lane Straddling Definition

An autonomous vehicle may define lane straddling as a motorcycle driving within a predetermined number of feet (e.g., 2 feet, 3 feet, 4 feet, 5 feet) of a marked line (center of motorcycle to center of lane marker) as opposed to driving in between two marked lines.

III.(d) Motorcycle Detection

An autonomous vehicle may detect the motorcycle(s) and associated lane(s) from at least a predetermined number of meters away (e.g., 100 m away, 150 m away, 200 m away).

An autonomous vehicle may detect the motorcycles in its current lane and adjacent lanes.

An autonomous vehicle may detect motorcycles in all other lanes from at least a predetermined number of meters away (e.g., 75 m away, 100 m away, 150 m away, 200 m away).

An autonomous vehicle may detect different categories of motorcycles; 2-wheel motorcycles and 3-wheel motorcycles, since this affects the maneuver capabilities.

An autonomous vehicle may detect (and predict) maneuvers and sudden movements of motorcycles in all lanes from at least a predetermined number of meters away (e.g., 25 m away, 35 m away, 50 m away, 60 m away, 70 m away).

An autonomous vehicle may be able to handle the micro-Doppler effect of wheels to avoid wrong detection of motorcycle speed, regarding LiDAR and/or radar detection for speed estimation). In some embodiments, an autonomous vehicle detects a motorcycle captured by a LiDAR point cloud and filters certain points out from the point cloud that are associated with the micro-Doppler effect of the wheels. In some embodiments, an autonomous vehicle detects a motorcycle based on a radar signal and filters the radar signal to remove noise associated with the micro-Doppler effect of the wheels.

In some embodiments, detection of a motorcycle is followed by the autonomous vehicle tracking (e.g., continuously, periodically) the detected motorcycle for a length of time, for example, the length of time that the detected motorcycle is within a pre-determined distance away from the autonomous vehicle. In some embodiments, tracking the detected motorcycle includes identifying the detected motorcycle in sensor data collected after the initial detection and updating relative distances and directions between the motorcycle and the autonomous vehicle using the sensor data. For example, a motorcycle is tracked in image data or video data.

III.(e) Group of Motorcycles Detection

An autonomous vehicle may detect a group of motorcycles and the associated lane from at least a predetermined number of meters away (e.g., 100 m away, 125 m away, 150 m away, 175 m away).

In some embodiments, detection of a group of motorcycles including determining a bounding box for each motorcycle and an aggregate footprint area or an aggregate bounding box for the group of motorcycles. As the motorcycles continue to operate, motorcycles can be added to or removed from the group of motorcycles. That is, a group of motorcycles is dynamically defined, and the aggregate footprint area or bounding box is dynamically defined.

III.(f) Motorcycle Lane Straddling Detection

An autonomous vehicle may detect motorcycles that do lane straddling from at least a predetermined number of meters away (e.g., 100 m away, 125 m away, 150 m away, 175 m away) in the autonomous vehicle's current lane and adjacent lanes.

Straddling in a lane includes straddling on both lane markings sides of the lane.

III.(g) Motorcycle Planning

An autonomous vehicle may maintain a safe distance of at least a predetermined number of meters away (e.g., 100 m away, 125 m away, 150 m away, 175 m away) from a motorcycle while following it as the target vehicle.

An autonomous vehicle may avoid merging into the lane of a motorcycle within a predetermined number of meters (e.g., 100 m, 125 m, 150 m, 175 m) of it.

An autonomous vehicle may avoid sharing a lane with motorcycles. In some jurisdictions or regions (e.g., California), motorcycles are permitted to share a lane with other vehicles. As such, an autonomous vehicle may share a lane with motorcycles depending on the jurisdiction or region within which the autonomous vehicle is located. In some embodiments, an autonomous vehicle biases away from a motorcycle with which the autonomous vehicle shares a lane.

Motorcycles typically can stop faster and accelerate faster than regular vehicles.

III.(h) Passing a Motorcycle

An autonomous vehicle may pass a motorcycle only when it is safe to do so.

An autonomous vehicle may avoid passing a motorcycle in the curves of more than a predetermined number of degrees (e.g., 15 degrees, 20 degrees, 25 degrees) on arbitrary roads.

An autonomous vehicle may only pass a lane splitting motorcycle from at least a lane over.

III.(i) Group of Motorcycles Classification

An autonomous vehicle may consider each motorcycle in a group of motorcycles as an individual motorcycle and follow the same requirements. In some examples, a motorcycle is grouped with other vehicles. For example, a group or convoy can include one or more motorcycles as well as one or more cars, trucks, and/or the like. For ease of description herein, such examples of groups are included when referring to a group of motorcycles.

An autonomous vehicle may avoid merging between the group of motorcycles and into their lanes. With definition of an aggregate footprint area or bounding box that represents the motorcycle group, the autonomous vehicle can avoid being located between individual motorcycles of the group. The aggregate footprint area or bounding box can be treated as a bounding box of an object with which the autonomous vehicle avoids collision or penetration, such as by maintaining a distance away from the aggregate area or box.

III.(j) Motorcycle Lane Straddling Behavior

An autonomous vehicle may interact with lane straddling motorcycle(s) autonomously and safely. Interactions with a lane straddling motorcycle are based upon a jurisdiction or region within which an autonomous vehicle is located. For example, California is an example jurisdiction in which motorcycle lane straddling is permitted, and an autonomous vehicle lane biases near a lane straddling motorcycle within changing lanes. In some examples in which the autonomous vehicle is located in a region that prohibits lane straddling, an autonomous vehicle may change lanes to a furthest lane from the lane straddling motorcycle to maximize avoidance of the illegal and unpredictable activity.

An autonomous vehicle may avoid blocking a lane straddling motorcycle(s) from passing it if it's possible and safe to do so.

An autonomous vehicle may avoid passing a motorcycle that is straddling a lane.

An autonomous vehicle may move to the left (right) of their lane to give motorcyclists ample room to pass if the autonomous vehicle is in the far left(right) lane. The autonomous vehicle may do so before the motorcycle reaches a pre-determined distance away from the autonomous vehicle.

Thus, generally, an autonomous vehicle determines a lane permission parameter (e.g., a lane change intention or a lane change denier) based on detection of a lane straddling motorcycle, and the autonomous vehicle operates in accordance with the lane permission parameter (e.g., by staying in the current lane, by changing lanes, by biasing within a lane).

Figure 5:
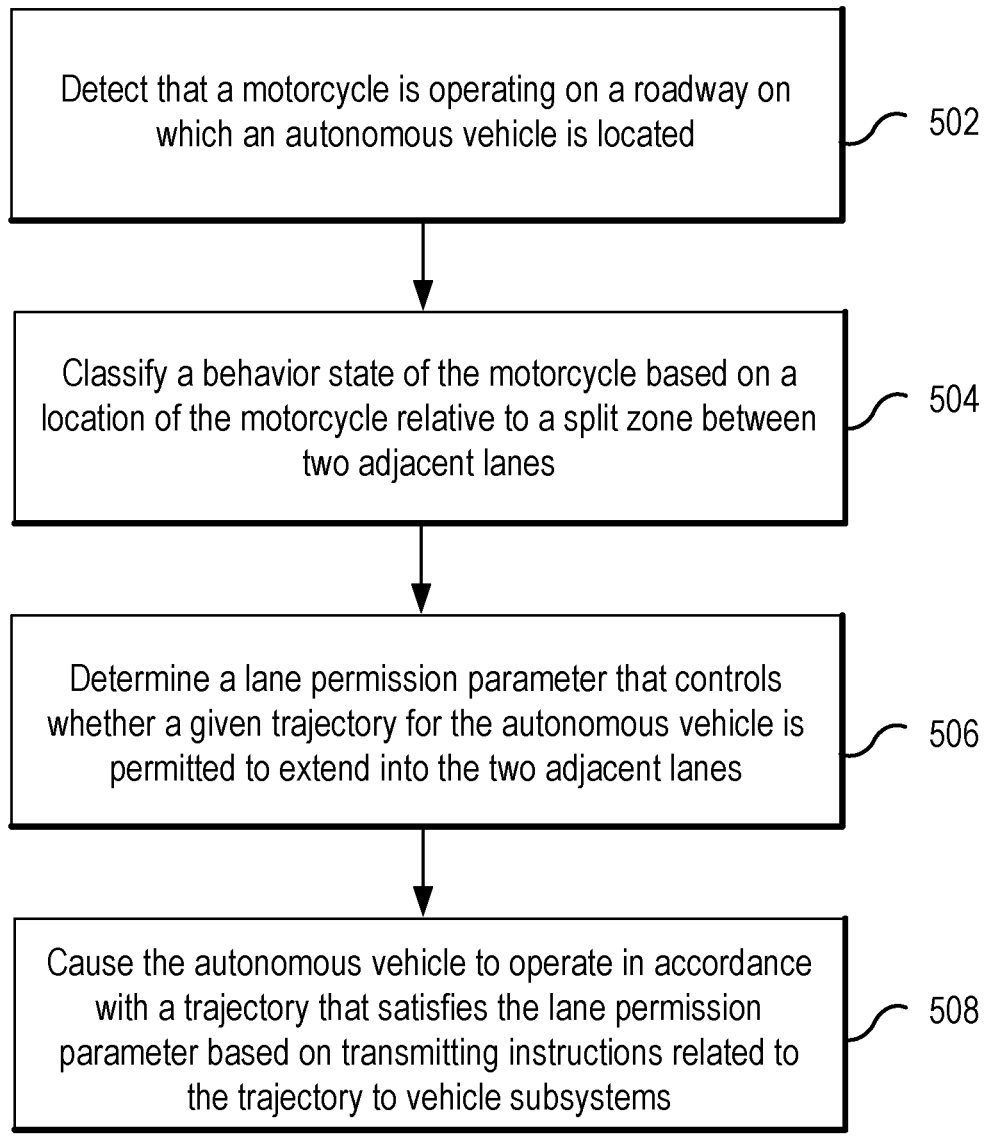
FIG. 5 shows an example flowchart of example operations for operating an autonomous vehicle responsive to a presence of motorcycles on a roadway.

FIG. 5 illustrates a flowchart of example operations performed in relation to a presence of one or more motorcycles on a roadway with an autonomous vehicle. In some embodiments, the operations are performed by the autonomous vehicle (e.g., an autonomous controller of the autonomous vehicle). In some embodiments, at least some of the operations may be performed by an oversight system or a remote computer, thereby conserving processing and computing effort at the autonomous vehicle.

At operation 502, the autonomous vehicle detects that a motorcycle is operating on a roadway on which an autonomous vehicle is located. The autonomous vehicle may detect the motorcycle using at least one of LiDAR devices, cameras, or radar devices. LiDAR data (e.g., a point cloud) may be filtered to remove a subset of the point cloud that is attributed to a micro-Doppler effect of wheels of the motorcycle. Upon detection of the motorcycle, the autonomous vehicle tracks the motorcycle in successive sensor data.

At operation 504, the autonomous vehicle classifies a behavior state of the motorcycle based on a location of the motorcycle relative to a split zone. The split zone is located between and extending into two adjacent lanes. For example, the autonomous vehicle classifies the motorcycle as lane splitting (e.g., a lane splitting behavior state) based on the location of the motorcycle being within the split zone. Alternatively, the autonomous vehicle classifies the motorcycle as not lane splitting (e.g., a normal behavior state, a non-splitting behavior state) based on the location of the motorcycle being outside of the split zone.

Figure 6:
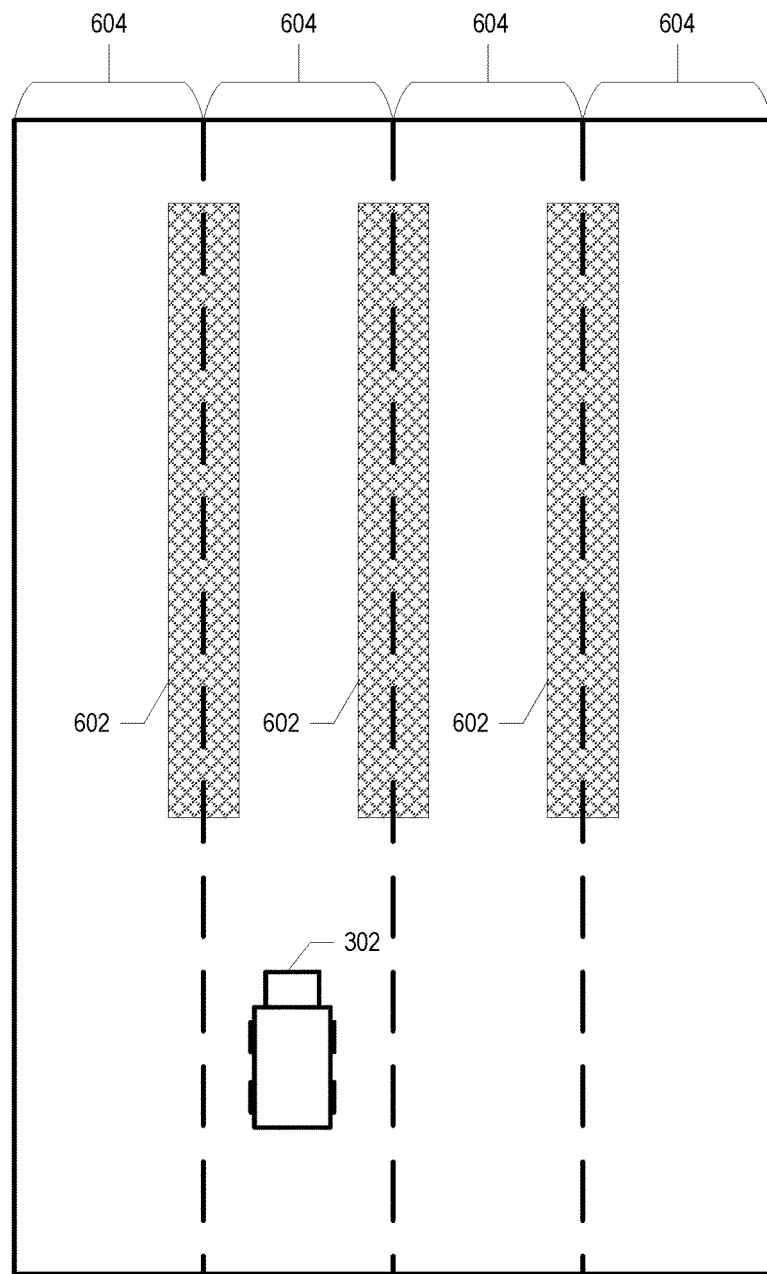
FIG. 6 illustrates a diagram of an example roadway on which an autonomous vehicle detects and handles motorcycles in accordance with embodiments disclosed herein.

Referring to FIG. 6, example split zones 602 of a roadway are illustrated. The roadway includes four lanes 604, and three split zones 602 are defined between the four lanes 604. In other examples, split zones are also defined between a lateral-most lane of a roadway and a shoulder area of a roadway (not explicitly illustrated). In some examples, a split zone 602 extends into a lane 604 by a distance or a width that leaves at least a width of the autonomous vehicle 302. In some examples, a split zone 602 extends into a lane 604 by less than half of a width of the lane 604. Thus, a split zone 602 may be defined with a width that is based on respective widths of the lanes 604 that it is defined between. In some examples, a split zone 602 is dynamically defined based on environmental conditions, road curvature, lane width, roadway material, and/or the like. For example, a split zone is defined with a wider width in rainy conditions to restrict the autonomous vehicle from sharing a lane with a motorcycle located in the split zone.

Returning to FIG. 5, at operation 506, the autonomous vehicle determines a lane permission parameter that controls whether a given trajectory for the autonomous vehicle is permitted to extend into the two adjacent lanes. In some embodiments, a lane permission parameter is specific to a given lane, and lane permission parameters are determined for the two adjacent lanes. In some embodiments, the lane permission parameter is a lane change intention or a lane change denier. The lane change intention permits the autonomous vehicle to change lanes, while the lane change denier restricts the autonomous vehicle from changing lanes. For example, the lane change intention and the lane change denier may be embodied by persistent commands, flags, controls, and/or the like indicated to (logically) downstream controllers of the autonomous vehicle or to a human operator of the autonomous vehicle.

In some examples, the lane permission parameter is determined based on whether the jurisdiction or region in which the autonomous vehicle is located permits motorcycle lane splitting or not. In some examples, the lane permission parameter is determined further based on a number of wheels of the motorcycle (e.g., three-wheel motorcycles are wider than two-wheel motorcycles and may not lane split as effectively).

At operation 508, the autonomous vehicle (e.g., the autonomous controller or system) causes the autonomous vehicle to operate in accordance with a trajectory that satisfies the lane permission parameter. In particular, the autonomous controller or system transmits instructions to one or more subsystems of the autonomous vehicle to operate (e.g., maneuver) the autonomous vehicle. As an illustrative example, the autonomous vehicle performs lane biasing away from the split zone and the motorcycle based on a lane permission parameter indicating that the autonomous vehicle is permitted to remain in one of the adjacent lanes. As another illustrative example, the autonomous vehicle moves from a current lane to a different lane before the autonomous vehicle is within a predetermined distance from the motorcycle, if the lane permission parameter restricts the autonomous vehicle from being within the two adjacent lanes.

In some embodiments, the autonomous vehicle indicates to a human and/or remote operator that a motorcycle is classified as lane splitting if the autonomous vehicle is located in a jurisdiction that does not permit lane splitting.

In some embodiments, the autonomous vehicle detects multiple other motorcycles with the motorcycle and performs operations related to handling groups of motorcycles.

Figure 7:
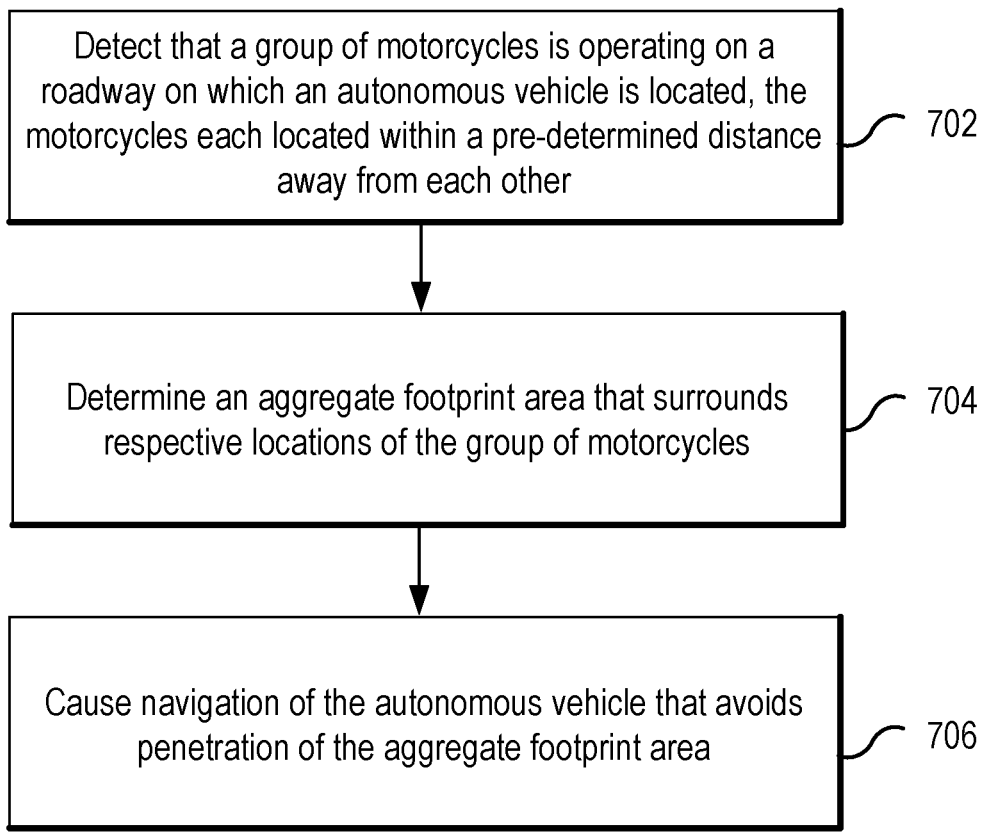
FIG. 7 shows an example flowchart of example operations for operating an autonomous vehicle responsive to a presence of motorcycles on a roadway.

FIG. 7 illustrates a flowchart of example operations performed in relation to a presence of one or more motorcycles on a roadway with an autonomous vehicle. In some embodiments, the operations are performed by the autonomous vehicle (e.g., an autonomous controller of the autonomous vehicle). In some embodiments, at least some of the operations may be performed by an oversight system or a remote computer, thereby conserving processing and computing effort at the autonomous vehicle.

At operation 702, the autonomous vehicle detects that a group of motorcycles is operating on a roadway on which the autonomous vehicle is located, the group of motorcycles being each located within a pre-determined distance away from one another.

At operation 704, the autonomous vehicle determines an aggregate footprint area that surrounds respective locations of the group of motorcycles.

At operation 706, the autonomous vehicle avoids penetration of the aggregate footprint area. For example, an autonomous controller on-board the autonomous vehicle causes navigation of the autonomous vehicle that avoids penetration of the aggregate footprint area based on transmitting navigation instructions to one or more subsystems (e.g., a steering subsystem, an engine subsystem, a power subsystem) of the autonomous vehicle. For example, a trajectory is determined for the autonomous vehicle that maintains a minimum lateral distance away from the aggregate footprint area. Further, the trajectory is determined to not intersect lines-of-sight between individual motorcycles of the group. Trajectories and lines-of-sight of the individual motorcycles may be predicted, such that the trajectory is determined to avoid intersecting or obstructing lines-of-sight between motorcycles at future points in time.

In some embodiments, the autonomous vehicle dynamically redefines the group and updates the aggregate footprint area based on tracking behavior of the motorcycles. For example, if an individual motorcycle leaves the group (e.g., is located farther than the pre-determined distance away from the others), then the individual motorcycle is no longer considered to be a part of the group, and the aggregate footprint area is re-defined accordingly. As another example, if an individual motorcycle joins the group, then the aggregate footprint area is re-defined to include the new motorcycle accordingly.

In some embodiments, the autonomous vehicle determines a lane permission parameter based on whether any individual motorcycles of the group are lane splitting.

IV. Object Perception

Detection and anticipation of upcoming objects is necessary to allow preemptive handling and maneuvering of autonomous vehicles. Objects are typically detected using sensors located on an autonomous vehicle, and thus, objects are perceived from a perspective or point-of-view of the autonomous vehicle. While objects are perceived relative to the autonomous vehicle, some maneuverings of the autonomous vehicle are defined with respect to lane-level topology of a roadway. A mapping of upcoming objects with respect to roadway-specific lane topology is necessary to determine appropriate lane-level maneuvering of an autonomous vehicle in a safe and early manner.

Figure 8:
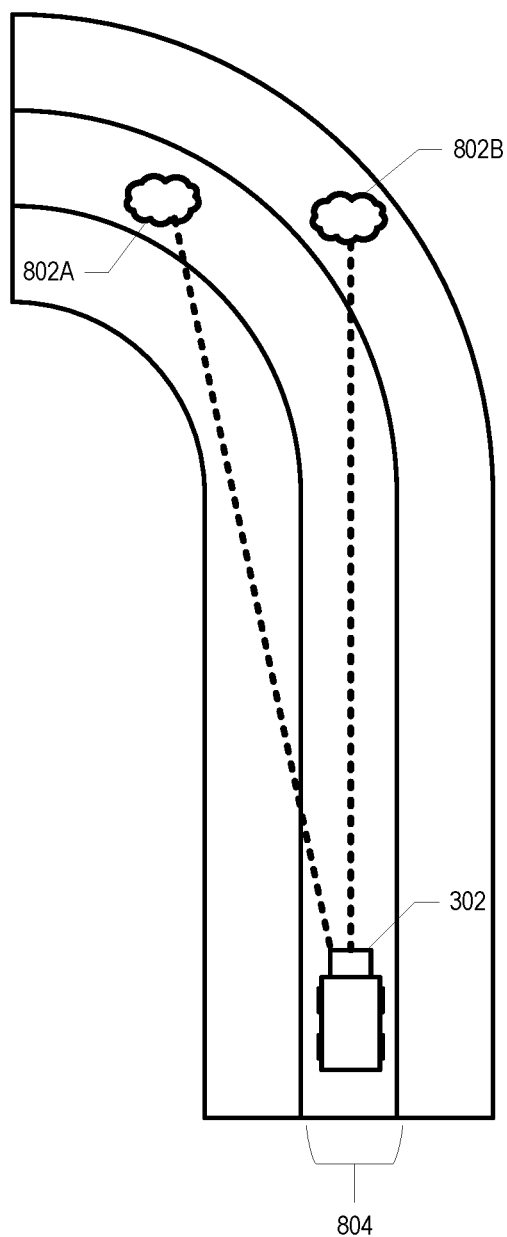
FIG. 8 illustrates a diagram of an example roadway on which an autonomous vehicle operates using object-to-lane associations (OTLAs).

For example, FIG. 8 illustrates a diagram of an autonomous vehicle 302 perceiving (e.g., sensing, detecting)

objects 802A and 802B. By nature of the autonomous vehicle 302 perceiving the object 802A using sensors located on the autonomous vehicle 302, the object 802A appears positioned off of a straight path of the autonomous vehicle 302 (e.g., in an "11 o'clock" direction). However, in the illustrated example, the object 802A is located within the same lane 804 of the autonomous vehicle 302, due to a curvature of the roadway.

A similar challenge is shown with object 802B, which is detected straight ahead of the autonomous vehicle 302. In the illustrated example, object 802B is actually located in a different lane than the autonomous vehicle 302, and significant avoidance maneuvers may not be necessary if the autonomous vehicle is aware that the object 802 is located in a different lane.

Thus, association of detected objects with lanes of a roadway enables earlier and safer maneuvering of the autonomous vehicle 302. Object-to-lane association provides valuable context to detection of objects. Detection of objects located far off in the distance is more actionable given lane and roadway context of the objects.

IV.(a) Object Perception

An autonomous vehicle may detect and analyze objects attributes within the field-of-view of the sensors of the autonomous vehicle.

An autonomous vehicle may associate an object to the lane or shoulder of the road that it is located at. (OTLA: Object To Lane Association)

An autonomous vehicle may classify objects as static or moving.

An autonomous vehicle may have the capability to reclassify objects, as their behavior changes.

IV.(b) Static Objects

An autonomous vehicle may detect static objects and analyze attributes of static objects within the sensor field-of-view of the autonomous vehicle and within road boundaries.

An autonomous vehicle may detect static objects with a predetermined minimum height (e.g., 2 inches, 3 inches, 4 inches, 5 inches).

An autonomous vehicle may detect all static objects that impact its capabilities (e.g., perception, localization, behavior, and driving capabilities.)

An autonomous vehicle may have the capability to detect and analyze attributes of static objects, including: size (e.g., dimensions), mobility (e.g., expectation of movement), classification (e.g., stopped vehicle, road signs, traffic lights, guardrails or barriers, bridges, etc.).

An autonomous vehicle may detect static objects from a predetermined minimum distance depending on, and relative to, its dimensions.

IV.(c) Moving/Moveable Objects

An autonomous vehicle may detect moving objects and analyze attributes of moving objects within the sensor field-of-view of the autonomous vehicle and within road boundaries.

An autonomous vehicle may have the capability to detect and analyze attributes of moving objects, including the size or dimensions of the moving objects. An autonomous vehicle may detect width and height of a moving object from at least a first predetermined number of meters and length of it from at least a second predetermined number of meters away. In some embodiments, the length of an object (e.g., along a direction of travel of the autonomous vehicle, parallel with a sensing direction/beam) is estimated based on movement of the object and based on a two-dimensional bounding box for the object. The two-dimensional bounding box may be based on the detected width and height. Thus, width and height are determined first to enable generation of a bounding box from which length of the object can be estimated.

An autonomous vehicle may also detect and analyze other attributes of moving objects, including speed and heading (e.g., velocity), acceleration, position (relative to the autonomous vehicle), and associated lane (or shoulder of the road).

Figure 9:
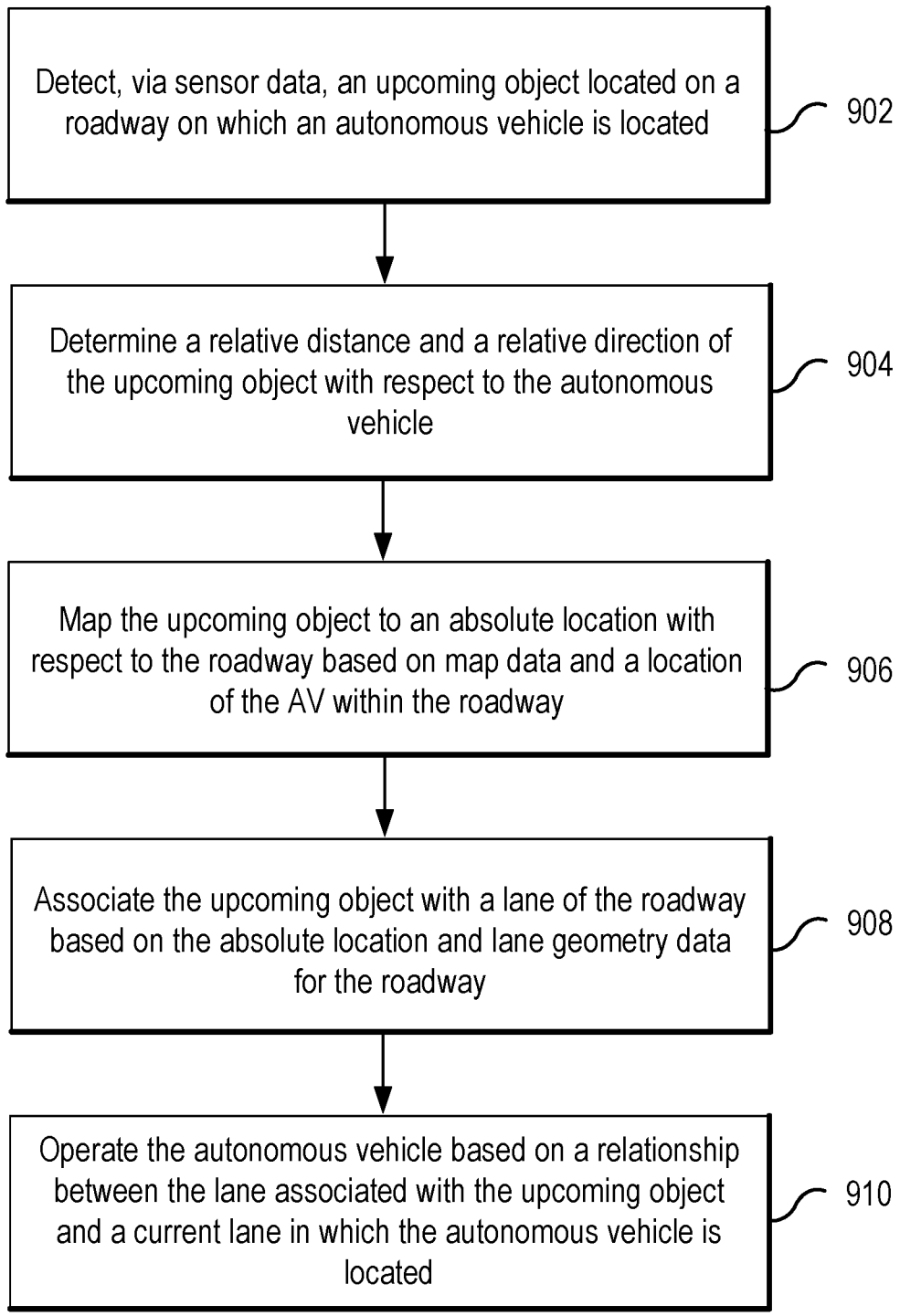
FIG. 9 shows an example flowchart of example operations for operating an autonomous vehicle based on OTLAs.

FIG. 9 illustrates a flowchart of example operations related to perception and localization of objects. In some embodiments, the operations are performed by the autonomous vehicle (e.g., an autonomous controller of the autonomous vehicle).

At operation 902, the autonomous vehicle detects, via sensor data collected from sensors located on the autonomous vehicle, an upcoming object located on a roadway on which the autonomous vehicle is located.

At operation 904, the autonomous vehicle determines, from the sensor data, a relative distance and a relative direction of the upcoming object with respect to the autonomous vehicle. In some embodiments, the relative distance and the relative direction are determined using a centroid of a LiDAR point cloud of the sensor data via which the upcoming object is detected.

At operation 906, the autonomous vehicle maps the upcoming object to an absolute location with respect to the roadway based on (i) map data that describes upcoming topology of the roadway and (ii) a location of the autonomous vehicle within the roadway.

At operation 908, the autonomous vehicle associates the upcoming object with a lane of the roadway based on the absolute location mapped to the upcoming object and lane geometry data for the roadway.

At operation 910, the autonomous vehicle (e.g., an autonomous controller or system) operates the autonomous vehicle based on a relationship between the lane associated with the upcoming object and a current lane in which the autonomous vehicle is located.

In some embodiments, the autonomous vehicle further tracks changes to the absolute location of the upcoming object for at least a length of time that the autonomous vehicle is approaching the upcoming object and updates the lane associated with the upcoming object based on the tracked changes. In some embodiments, the autonomous vehicle tracks the upcoming object across other sensor data collected from a different set of sensors located on the autonomous vehicle. The different set of sensors are configured for a different sensing modality than the sensors, and the relative distance and the relative direction of the upcoming object are determined further from the other sensor data.

In some embodiments, the autonomous vehicle further classifies the upcoming object as a static object or a moving object, and the autonomous vehicle operates further based on whether the upcoming object is classified as a static object or a moving object. In response to classifying the upcoming object as a moving object, the autonomous vehicle updates the absolute location of the upcoming object at a pre-determined frequency. In response to classifying the upcoming object as a static object, the autonomous vehicle monitors the upcoming object for movement and re-classifies the upcoming object as a moving object based on a threshold degree of movement of the upcoming object being detected.

In some embodiments, the autonomous vehicle further classifies the upcoming object as a vehicular object or a non-vehicular object, and the autonomous vehicle operates further based on whether the upcoming object is classified as a vehicular object or a non-vehicular object. In response to classifying the upcoming object as a vehicular object, the autonomous vehicle updates the absolute location of the upcoming object at a pre-determined frequency. In response to classifying the upcoming object as a non-vehicular object, the autonomous vehicle updates the upcoming object for movement and maintains at least a minimum distance away from the upcoming object corresponding to movement of the upcoming object.

In some embodiments, the autonomous vehicle predicts a degree of movement of the upcoming object, and the autonomous vehicle operates further based on the predicted degree of movement. The autonomous vehicle updates the absolute location of the upcoming object at a pre-determined frequency that is based on the predicted degree of movement. The degree of movement is predicted based on whether or not the upcoming object is a vehicle.

In some embodiments, the autonomous vehicle associates the upcoming object with a shoulder area of the roadway based on the lane geometry data defining shoulder areas of the roadway. In some embodiments, the lane associated with the upcoming object includes a shoulder area of the roadway. In some embodiments, at least a portion of the map data is provided by one or more vehicles that traveled through or are located at an upcoming portion of the roadway.

In some embodiments, the autonomous vehicle determines a size of the upcoming object from the sensor data and executes either a lane change or a lane bias based on the size of the upcoming object if the upcoming object is in the same lane as the autonomous vehicle. In some embodiments, the autonomous vehicle determines a width of the upcoming object when the autonomous vehicle is a first distance away from the upcoming object and determines a length of the upcoming object when the autonomous vehicle is a second distance away from the upcoming object. The second distance is less than the first distance, and the autonomous vehicle is operated further based on the width and the length of the upcoming object.

In some embodiments, the upcoming object is determined to be a motorcycle, and the autonomous vehicle is operated according to various embodiments described herein relating to motorcycle operations.

V. Speed Control

According to various embodiments, an autonomous vehicle may be operated according to determined speeds to ensure safe and compliant operation of the autonomous vehicle. In some embodiments, speeds for the autonomous vehicle may be determined based on roadway conditions, roadway characteristics, and regulations controlling a roadway on which the autonomous vehicle is operating. In some examples, speeds for the autonomous vehicle, along with other trajectory-related information, may be determined based on regulation and other roadway information indicated by road signs located along the roadway that are detected by the autonomous vehicle. For example, the autonomous vehicle may detect various road signs as the autonomous vehicle travels along a roadway using various sensors including cameras, LiDAR sensors, radar devices, or the like.

V.(a) Speed Control—Obey Speed Limits

At all times, an autonomous vehicle may drive at or below the posted speed limit. In some embodiments, a speed of the autonomous vehicle may be determined to satisfy or comply with the posted speed limit if the speed is at or below the posted speed limit. In some embodiments, a speed of the autonomous vehicle may be determined to satisfy or comply with the posted speed limit if the speed is below the posted speed limit within a predetermined threshold (e.g., 5 miles per hour under the posted speed limit, 10 miles per hour under the posted speed limit, 20 miles per hour under the posted speed limit). In some embodiments, a speed of the autonomous vehicle may be determined to satisfy or comply with the posted speed limit if the speed is within a predetermined threshold above or below the posted speed limit (e.g., 5 miles per hour above or below the posted speed limit, 10 miles per hour above or below the posted speed limit, 15 miles per hour above or below the posted speed limit). In some implementations, the amount that the autonomous vehicle may operate above or below the posted speed limit may be included in map data used for navigation and operation of the autonomous vehicle (e.g., by an autonomous driving system on the autonomous vehicle, by an oversight system or remote computer controlling the autonomous vehicle). In some embodiments, the amount above or below the posted speed limit may be configurable based on local weather events, road conditions and topology, historical data describing speeds at which vehicles have been historically flagged for violation of the posted speed limit, or the like.

V.(b) Speed Control—Obey Speed Limits—Ramps

When merging on or off a highway, an autonomous vehicle may operate at a speed that satisfies any speed limits posted at the on-ramp or off-ramp on which the autonomous vehicle is operating. In some embodiments, the autonomous vehicle may detect a road sign and determine, based on information indicated by the road sign, whether the road sign indicates a speed limit specific to an on-ramp or an off-ramp (e.g., as opposed to lanes of the highway).

V.(c) Speed Control—Obey Speed Limits—Nighttime Speed

When driving after the sun has set, an autonomous vehicle may obey any nighttime specific speed limits. In some embodiments, nighttime specific speed limits may be indicated in map data that is provided to the autonomous vehicle and may be associated with a range of times. In some embodiments, nighttime specific speed limits are indicated by road signs present in the environment exterior to the autonomous vehicle, and the autonomous vehicle determines the nighttime specific speed limits for a roadway on which the autonomous vehicle is operating based on detecting the road signs. In some implementations, nighttime speed limits may be included in map data used for navigation and operation of the autonomous vehicle (e.g., by an autonomous driving system on the autonomous vehicle, by an oversight system or remote computer controlling the autonomous vehicle).

V.(d) Speed Control—Obey Contract Speed Limit

At all times, an autonomous vehicle may drive at or below any contract speed limits that are in place.

A contract speed limit is a limit that is set on the autonomous vehicle system's maximum speed, typically dictated by the terms of a contract with a partner or agreed upon by a set of stakeholders. For example, a partner or stakeholder that may be a company or entity that is associated with ownership of cargo being transported by the autonomous vehicle may indicate a contract speed limit based on the cargo.

V.(e) Speed Adjustments for Control of Autonomous Vehicle

An autonomous vehicle may maintain the posted speed limit (or less) with a reduction from the current speed as needed for control. For example, when the autonomous driving system determines that the weather or road conditions do not permit the autonomous vehicle to operate at the posted speed limit because the autonomous vehicle would be in danger of losing control or not having a sufficient distance between it and a NPC vehicle (e.g., a surrounding vehicle, including a manually operated vehicle or another autonomous vehicle that is not in direct communication with the autonomous vehicle) ahead, then the current speed of the autonomous vehicle may be reduced from the posted speed limit. The conditions which may warrant speed adjustments may be confirmed or justified by an oversight system, including by a remote control operator associated with an oversight system. Additionally, or alternatively, other autonomous vehicles along the same route or in adjacent locations may provide information which informs the determination that speed adjustment is warranted.

V.(f) Map—Speed Limit Information

Map data used with autonomous operation of the autonomous vehicle may include speed limit information for all mapped routes. In particular, a given length of roadway defined in the map data may be associated with one or more speed limit values that are applicable to vehicles located within the given length of roadway.

V.(g) Oversight—Update Speed Limits

Upon detecting a speed limit sign that indicates a different speed limit value than that included in map data, an autonomous vehicle may communicate the different speed limit value to an oversight system or remote computer. The autonomous vehicle may additionally communicate a location of the speed limit sign and/or the like autonomous vehicle to the oversight system. The oversight system may communicate the different speed limit value to one or more other autonomous vehicles, for example, in a map update.

In some embodiments, the map used by the autonomous vehicle may be stored locally at the autonomous vehicle. In some embodiments, the autonomous vehicle causes update of the map based on new speed limit sign encounters or speed limit discrepancies when the map is remotely stored (e.g., at an oversight system). For example, the autonomous vehicle transmits an indication of a new speed limit, an updated speed limit, or a speed limit discrepant with the map information to a remote computer of the oversight system. In some instances, updates to map information, including changes to the speed limit, may be provided by another autonomous vehicle that is in communication with the autonomous vehicle. Other autonomous vehicles, such as autonomous vehicles in a fleet, may communicate directly (e.g., V2V) or via an oversight system (e.g., V2C2V) or through another structure or means (e.g., data storage points, V2X2V).

V.(h) Detect all Speed Limit Signs

An autonomous vehicle may be able to detect and classify all speed limit signs, including signs on local roads, highways, construction zones, and entry and exit ramps. This detection and classification may be done by the autonomous vehicle using data acquired by the suite of sensors aboard the autonomous vehicle, as well as computing modules on the autonomous vehicles configured to identify speed limit signs based on any of: sign color, overall sign shape, and the reading of icons or words on the sign. Alternatively, or additionally, a map or map database may have areas of changing speed limit identified, or areas of construction or other types of temporary speed limit changes identified, and the autonomous driving system may be more alert in those areas to evaluate signs for speed limit postings.

V.(i) Speed Control—Speed Limit Timing

An autonomous vehicle may operate at a speed that is at or below a given speed limit by the time the frontmost point of the autonomous vehicle reaches the speed limit sign that indicates the given speed limit. As such, a deceleration rate for the autonomous vehicle to reach a speed below a speed limit indicated by a sign detected at a distance away from the vehicle may be based on the distance at which the sign is detected.

V.(j) Speed Limit Sign Road Association

An autonomous vehicle may associate speed limit signs to the correct road structure. For example, a speed limit sign that is on an off-ramp, but still visible from the highway, may be associated with the ramp and not the highway. Thus, in detection of a speed limit sign, the autonomous vehicle identifies relative distances between the speed limit sign and nearby road structures and associates the speed limit sign with a given road structure based on the relative distances.

In some examples, a road sign associated with an on-ramp or an off-ramp may include text such as RAMP, EXIT, or the like, and the autonomous vehicle may detect and interpret text on a road sign. In other examples, a road sign may include directional indicators (e.g., arrows) indicating a particular road segment or structure to which the road sign corresponds. In other examples, the autonomous vehicle may identify the corresponding road segment for a road sign based on a location of the road sign. For example, the road sign may be located between a main segment of the roadway and an off-ramp, and based on the road sign being located closer to the ramp than to the main segment of the roadway, the autonomous vehicle may identify the ramp as being associated with the road sign. As another example, the road sign may be located on a side of a ramp opposite of a main segment of the roadway (thus being far removed from the main segment of the roadway), and the autonomous vehicle may identify the off-ramp as being associated with the road sign.

V.(k) Engine Braking for Efficiency Lane Changes

An autonomous vehicle may prefer to use engine braking when slowing as part of seeking a gap to lane change into for efficiency lane change intentions or intentions of lower priority.

V.(l) Engine Braking for Following Distance

An autonomous vehicle may prefer to use engine braking when growing or maintaining a following distance gap to another vehicle. For an internal combustion engine, engine braking may include use of a compression release engine braking mechanism configured for decompression of select cylinders, as well as switching to a lower gear. For electric motor autonomous vehicles, energy or power may be reduced to one or more motors powering the wheels of the autonomous vehicle.

V.(m) Precautionary Slow Down—Signalized Intersection

When approaching a signalized intersection, an autonomous vehicle may have a precautionary slow down starting a pre-determined distance before the intersection, such as 90 meters away from the intersection, 100 meters away from the intersection, 110 meters from the intersection, including 120 meters from the intersection.

An autonomous vehicle may have a maximum passing speed equal to the posted speed limit or up to 50 mph at the pre-determined distance away from the intersection.

V.(n) Precautionary Slow Down— T Intersection

When traveling in the through lane directly perpendicular to the non-through lane of a T-intersection, an autonomous vehicle may have a precautionary slow down (e.g., using engine braking) of no more than a pre-determined number of mph under the speed limit, such as 5 mph under the speed limit, 10 mph under the speed limit, 15 mph under the speed limit, and including 20 mph under the speed limit, if there is a vehicle stopped or approaching in the non-through lane.

V.(o) Downhill Grade—Engine Braking Preferred

When going downhill and deceleration is necessary, an engine braking operation is associated with a higher priority or preference than other braking operations. For a vehicle with an internal combustion engine, engine braking may include changing to a lower gear of the transmission (e.g., one with a smaller diameter than the current gear), generating backpressure or a vacuum in the engine, or selectively decompressing one or more cylinders of the engine during a combustion stroke. A motor in an electrical vehicle, an autonomous vehicle that has battery or fuel-cell powered motor(s), may achieve engine braking by depowering the motor(s) and/or changing gears (if available).

V.(p) Uphill Grade—Power Adjustment under Load

When going uphill, an autonomous vehicle may provide additional power as necessary to maintain the targeted speed under different trailer loads.

V.(q) Decrease in Speed Limit—Engine Braking Preferred

When approaching a decrease in the speed limit, an autonomous vehicle may proactively slow down to the targeted speed using engine braking only, unless additional deceleration is required for an evasive maneuver. Engine braking may be accomplished in an autonomous vehicle with an internal combustion engine by employing any of: J-brakes (i.e., Jakes brakes), cylinder deactivation, or downshifting of gears in the transmission.

V.(r) Increase in Speed Limit—Optimal Acceleration

After passing a speed limit sign that indicates an increased speed limit value, an autonomous vehicle may accelerate to a speed at the increased speed limit value (and above a previous speed limit value). The autonomous vehicle may use an acceleration rate that optimizes for best fuel efficiency. In some examples, the autonomous vehicle uses a higher acceleration rate based on a route progress (e.g., the autonomous vehicle is behind schedule and route arrival is prioritized over performance). Thus, in some examples, the autonomous vehicle references map and route data and determines an acceleration rate accordingly. In some examples, the oversight system may provide guidance when greater acceleration is needed. For example, the oversight system transmits an instruction or command to the autonomous vehicle to use a greater acceleration rate.

V.(s) Limit Acceleration and Deceleration as Needed for Control

Under all speed adjustments, an autonomous vehicle may set limits on the acceleration and deceleration to ensure the tractor and trailer do not destabilize and tip over, sway, or slip. The autonomous vehicle may determine orientation of itself using sensors including one or more inertial measurement unit (IMU), data obtained by cameras and other sensor, and the like to determine not only the current orientation of the autonomous vehicle, but also so predict possible changes to the orientation of the autonomous vehicle based on a possible loss of control due to changes in the speed of the autonomous vehicle.

V.(t) Speed Control when Approaching Signalized Intersections

When approaching a local signalized intersection, an autonomous vehicle may reduce its speed based a max speed equal to the posted speed limit or up to 50 mph. An autonomous vehicle may reach the target speed at least a pre-determined distance before the intersection, such as 90 meters away from the intersection, 100 meters away from the intersection, 110 meters from the intersection, including 120 meters prior to the stop line of the intersection, as measured from autonomous vehicle's front bumper to the stop line.

An autonomous vehicle may prefer to use engine braking or coasting to accomplish the required deceleration.

V.(u) Curved Roads and Turns—Post-Apex Behavior

When on a curved road or intersection turn, an autonomous vehicle may speed up after passing the apex of the curve/turn with a ramp up value to ensure smooth acceleration and deceleration.

V.(v) Curved Roads and Turns—Pre-Apex Behavior

When approaching or on a curved road or intersection turn, autonomous vehicle may slow down, preferably using engine braking, before reaching the apex of the curve with a ramp up value that ensures smooth acceleration and deceleration.

V.(w) Speed Control—Speed Limit Timing

An autonomous vehicle may be at or below the speed limit by the time the frontmost point of the autonomous vehicle combination reaches the speed limit sign. The timing of when an autonomous vehicle reaches the speed limit posted on a roadside sign may depend on the regulation of the jurisdiction in which the sign is located.

VI. Stopped Vehicles

An autonomous vehicle may encounter stopped vehicles while operating along a roadway. In some examples, a vehicle being stationary is abnormal in some contexts, and normal in other contexts. The autonomous vehicle may appropriately decide whether or not to navigate around stopped vehicles. As stopped vehicles can quickly resume motion, the autonomous vehicle must safely navigate around stopped vehicles. Further, navigation around a stopped vehicle (or multiple thereof) must be precise, even more so when the autonomous vehicle is a tractor-trailer vehicle.

VI.(a) Classifications

A stopped vehicle (STV) may refer to a vehicle that is stationary/unmoving for any duration of time. This may include vehicles stopped on the shoulder, vehicles stopped in the middle of the highway, vehicles stopped at a traffic light, and vehicles stopped in a traffic jam, among others.

An abnormal stopped vehicle may refer to a stopped vehicle that is stopped for reasons unrelated to traffic congestion or regulatory signs/signals. For example, a stopped vehicle at a traffic light that is on red is not classified as an abnormal stopped vehicle, whereas an emergency vehicle stopped in the middle of the highway for an emergency is classified an abnormal stopped vehicle.

A protruding abnormal stopped vehicle may refer to an abnormal stopped vehicle that intersects more than one lane (including shoulders). That is, this type of stopped vehicle protrudes into at least one other lane.

An abnormal stopped vehicle bounding region may refer to a region that includes all abnormal stopped vehicles that are within close vicinity of each other. If there is only one abnormal stopped vehicle, then the bounding region is equivalent to the space taken up by that vehicle. Vehicles may be within a predetermined number of meters (e.g., 20, 30, 40 meters) longitudinally of each other and 7.3 meters laterally to be considered within the same bounding region.

A traffic jam may refer to a line of road traffic at or near a standstill. To be considered a traffic jam, the average speed of vehicles in all lanes within a predetermined number of meters (e.g., 125 meters, 150 meters, 175 meters, 200 meters) of the autonomous vehicle may be traveling less than a threshold speed (e.g., 8 mph, 10 mph, 12 mph). To be considered a traffic jam, the lanes that are visible may include a line of vehicles with an average bumper to bumper distance less than a predetermined number of meters (e.g., 8 meters, 9 meters, 10 meters, 12 meters, 15 meters) between each consecutive vehicle.

VI.(b) Preferred Lateral Distance to Stopped Vehicle

The autonomous vehicle may prefer to drive with a predetermined minimum lateral distance measured from the widest point of the autonomous vehicle to the widest point of the abnormal stopped vehicle bounding region. The predetermined minimum lateral distance may be a tunable parameter with a nominal value of any of 8 feet, 10 feet, 12 feet, 14 feet, or 15 feet.

VI.(c) Lane Change Priority—Lanes Intersected by STV

The lane change priority when in lanes that are penetrated by an abnormal stopped vehicle bounding region may be a critical safety priority, or a high priority level compared to other priority levels.

VI.(d) Lane Change Priority—Lanes Not Intersected by STV

The lane change priority when within a predetermined minimum lateral distance but not in lanes that are penetrated by an abnormal stopped vehicle bounding region may be non-critical safety priority, or a priority level less than a critical safety priority level. A predetermined minimum lateral distance may be a tunable parameter with a nominal value of any of 8 feet, 10 feet, 12 feet, 14 feet, or 15 feet.

VI.(e) Stopped Vehicle Lane Change Reaction Distance

If a lane change is required for an abnormal stopped vehicle bounding region, an autonomous vehicle may react no later than the distance required to successfully change lanes before reaching the bounding region or a predetermined minimum prescribed distance, whichever distance is greater. The predetermined minimum prescribed distance may be a tunable parameter with a nominal value of any of 200 meters, 250 meters, 275 meters 300 meters, 325 meters, or 350 meters.

VI.(f) Unable to Pass Stopped Vehicle

If an autonomous vehicle is driving in a lane that is penetrated by an abnormal stopped vehicle and the autonomous vehicle is unable to change lanes, the autonomous vehicle may come to a complete stop before reaching the stopped vehicle. In some examples, a minimal risk condition command, or a command for the vehicle to reach a minimal risk condition (e.g., a complete stop), is issued by the autonomous vehicle, an operator, or the oversight system.

VI.(g) Slow Down and Pass Strategy for Stopped Vehicles

When unable to satisfy the preferred lateral distance to an abnormal stopped vehicle bounding region, an autonomous vehicle may slow down and pass the bounding region within the preferred lateral distance only if a collision can be avoided.

VI.(h) Max Passing Speed—Stopped Vehicle—Highway

The max highway passing speed when driving within the preferred lateral distance of an abnormal stopped vehicle bounding region may be a predetermined velocity below the speed limit. The predetermined velocity may be a tunable parameter with a nominal value of any of 15 MPH, 18 MPH, 20 MPH, 22 MPH, or 25 MPH, for example.

VI.(i) Max Passing Speed—Stopped Vehicle—Local

The max local road passing speed when driving within a preferred lateral distance of an abnormal stopped vehicle bounding region may be a predetermined velocity below the speed limit. The predetermined velocity may be a tunable parameter with a nominal value of any of 8 MPH, 10 MPH, 12 MPH, 15 MPH, 18 MPH, and 20 MPH, for example.

VI.(j) Minimum Lateral Distance to Pass STV

An autonomous vehicle may slow down and pass an abnormal stopped vehicle bounding region only if the autonomous vehicle can maintain a lateral distance of at least a predetermined minimum distance with the bounding region. The predetermined minimum distance may be a tunable parameter with a nominal value of any of 1.0 meters, 1.2 meters, 1.3 meters, 1.4 meters, 1.5 meters.

VI.(k) Stopped Emergency Vehicle

If the abnormal stopped vehicle bounding region includes an emergency vehicle, the autonomous vehicle considers the abnormal stopped vehicle bounding region as an emergency vehicle and operates accordingly.

Figure 10:
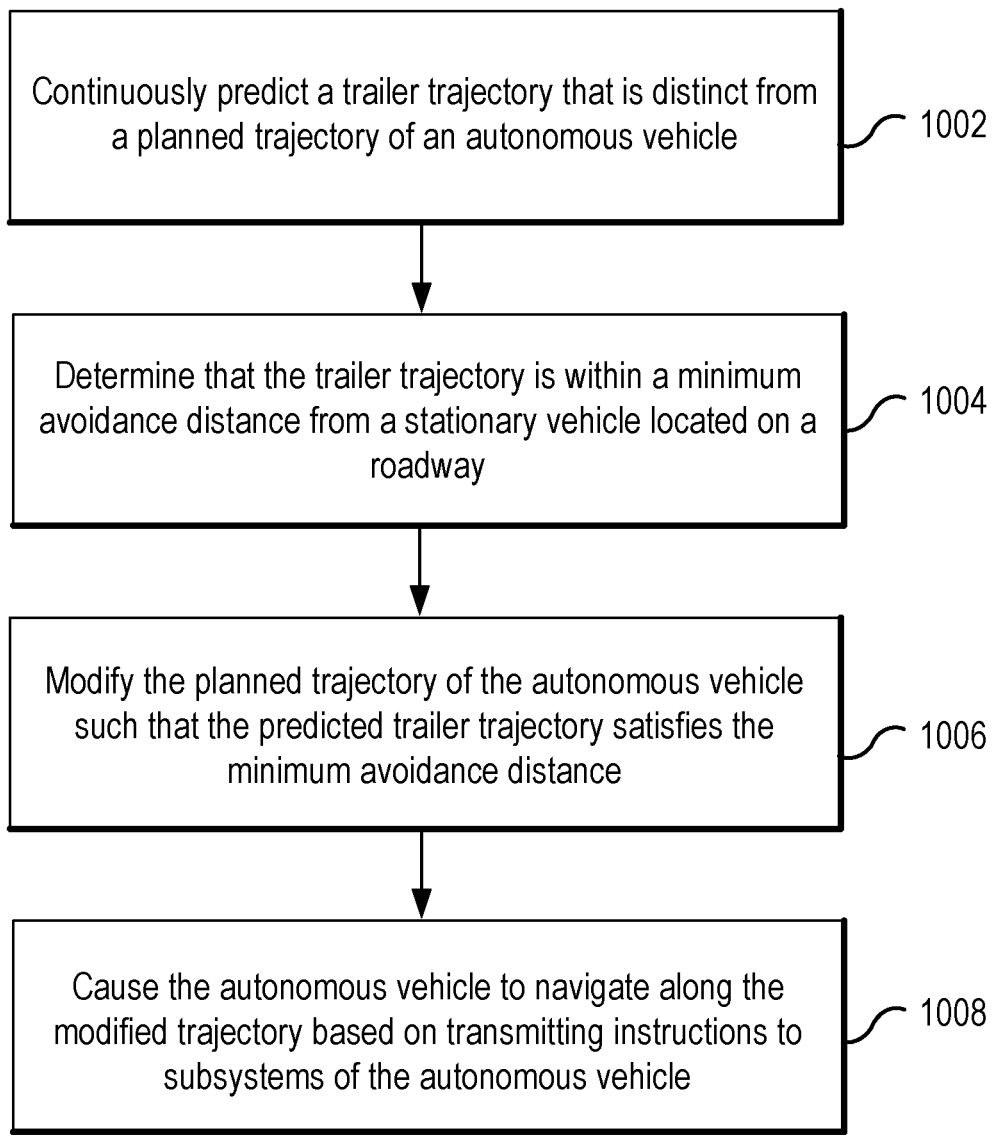
FIG. 10 shows an example flowchart of example operations for operating an autonomous vehicle in relation to a stopped vehicle.

FIG. 10 illustrates a flowchart of example operations related to speed control and handling near stopped vehicles. In some embodiments, the operations are performed by the autonomous vehicle (e.g., an autonomous controller of the autonomous vehicle). In some embodiments, at least some of the operations may be performed by an oversight system or a remote computer, thereby conserving processing and computing effort at the autonomous vehicle. The example operations are performed for an autonomous vehicle to which a trailer is coupled. For example, the autonomous vehicle is a tractor of a tractor-trailer combination.

At operation 1002, the autonomous vehicle continuously predicts a trailer trajectory that is distinct from a planned trajectory of an autonomous vehicle. In some embodiments, the trailer trajectory is continuously predicted using sensor data that indicates an angle of the trailer with respect to a lengthwise axis of the autonomous vehicle. The sensor data can include image data collected by rearward facing cameras that captures an area in which the trailer is located. In some embodiments, the trailer trajectory is continuously predicted based on trailer configuration data that includes a length of the trailer and a relative location at which the trailer is coupled to the rear of the autonomous vehicle. In some embodiments, the trailer trajectory is continuously predicted based on a weight of a trailer load in the trailer and environmental conditions of the roadway. In some embodiments, the trailer trajectory is continuously predicted based on a curvature of the roadway that is indicated in map data accessible by the controller. In some embodiments, the trailer trajectory is continuously predicted based on a dynamic model of the trailer whose movement is simulated by the controller, and the dynamic model is configured with one of multiple pre-determined weights of trailer load.

At operation 1004, the autonomous vehicle determines that the trailer trajectory is within a minimum avoidance distance from a stopped or stationary vehicle located on the roadway on which the autonomous vehicle is located.

Figure 11:
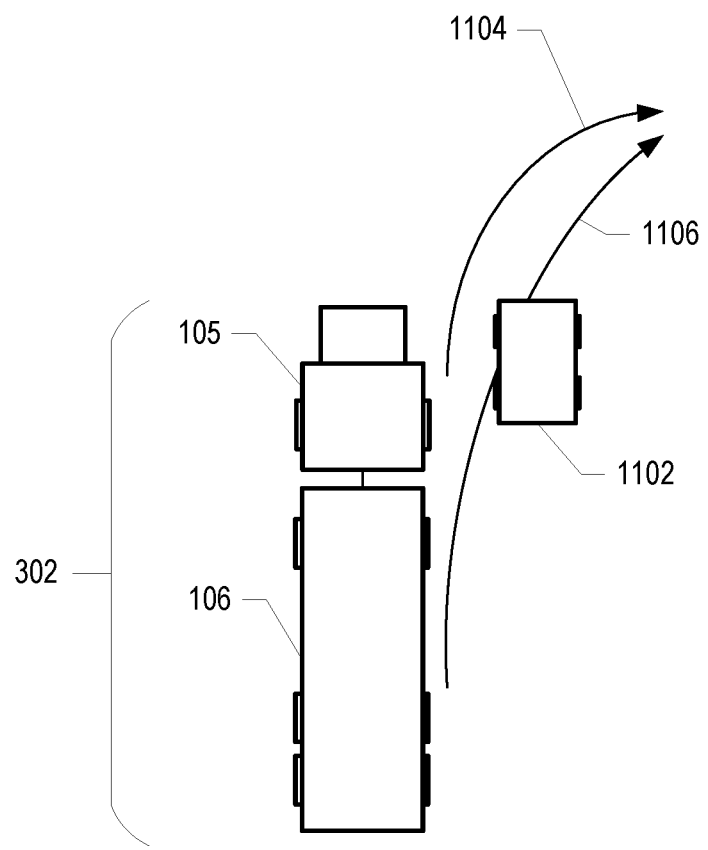
FIG. 11 illustrates a diagram of an example tractor-trailer behavior in relation to a stopped vehicle.

Referring to FIG. 11, an example autonomous vehicle 302 is illustrated, and the autonomous vehicle 302 includes a trailer 106 that is connected to a rear of a tractor, or an autonomous vehicle 105. A stopped vehicle 1102 is located near the autonomous vehicle 302. The autonomous vehicle 302 (a controller on the autonomous vehicle 302) is configured to determine and predict trajectory paths of the trailer 106 and of the tractor 105. A planned trajectory 1104 of the tractor 105 is illustrated, and the autonomous vehicle 302 determines a trailer trajectory 1106 based at least on the planned trajectory 1104. In the illustrated example, the trailer trajectory 1106 fails to satisfy a minimum avoidance distance from the stopped vehicle 1102.

Returning to FIG. 10, at operation 1006, the autonomous vehicle modifies the planned trajectory of the autonomous vehicle such that the predicted trailer trajectory satisfies the minimum avoidance distance. In some embodiments, operation 1006 includes iteratively modifying the planned trajectory and predicting the trailer trajectory in response to the iterative modifications until the trailer trajectory satisfies the minimum avoidance distance (or until another stopping condition, such as a maximum number of iterations, occurs). In some embodiments, the modified trajectory includes a lane change in response to the stationary vehicle being located in a same lane as the autonomous vehicle. In some embodiments, the modified trajectory includes a complete stop based on a failure to predict a trailer trajectory that navigates around the stationary vehicle while satisfying the minimum avoidance distance away from the stationary vehicle. In some embodiments, the modified trajectory includes a complete stop based on the stationary vehicle occupying all lanes of the roadway.

At operation 1008, the autonomous vehicle navigates (a controller of the autonomous vehicle causes the autonomous vehicle to navigate) along the modified trajectory based on instructions being transmitted (by the controller) to subsystems of the autonomous vehicle.

In some embodiments, the autonomous vehicle further determines a target speed of the autonomous vehicle based on the predicted trailer trajectory, and in response to the target speed being lower than a current speed of the autonomous vehicle, reaches the target speed using engine braking. For example, an autonomous controller transmits instructions to perform engine braking to a braking and/or transmission subsystem of the autonomous vehicle. In some embodiments, the autonomous vehicle further determines a target speed of the autonomous vehicle based on the predicted trailer trajectory and reaches the target speed at an acceleration rate that is less than a pre-determined acceleration limit. For example, an autonomous controller transmits instructions to cause the autonomous vehicle to reach the target speed to a power and/or engine subsystem of the autonomous vehicle. In some embodiments, the trailer trajectory is predicted based on a current speed of the autonomous vehicle, and the target speed is determined in connection with the modified trajectory to satisfy the minimum avoidance distance.

In some embodiments, the autonomous vehicle further continuously predicts a vertical tipping motion of the trailer based on a current speed of the autonomous vehicle, and the planned trajectory is modified to further satisfy a tipping angle limit for the trailer.

In some embodiments, the autonomous vehicle further determines a likelihood that the stationary vehicle will resume movement, and the minimum avoidance distance is based on the likelihood. In some embodiments, the autonomous vehicle predicts a future trajectory of the stationary vehicle, and the planned trajectory of the autonomous vehicle is modified such that the predicted trailer trajectory satisfies the minimum avoidance distance with respect to the future trajectory. In some embodiments, the autonomous vehicle classifies the stationary vehicle as a normal stationary vehicle or an abnormal stationary vehicle, and the minimum avoidance distance from the stationary vehicle is based on the classifying.

In some embodiments, the autonomous vehicle associates the stationary vehicle to a particular lane of the roadway, wherein the modified trajectory is configured to cause the autonomous vehicle to travel to a different lane of the roadway than the particular lane.

In some embodiments, the modified trajectory satisfies a lane permission parameter that is determined based on one or more motorcycles operating on the roadway. In some embodiments, the modified trajectory avoids penetration of an aggregate footprint are that surrounds respective locations of a group of motorcycles that are operating on the roadway.

VII. Trailer Trajectory Tracking

In some embodiments, an autonomous vehicle is configured to track and/or predict a trajectory of a trailer coupled to the autonomous vehicle, and the autonomous vehicle uses the trajectory of the trailer to navigate around obstacles (e.g., a stopped vehicle) and along lanes of a roadway. In some embodiments, the autonomous vehicle tracks the trailer trajectory based on trailer angle feedback in real-time and/or predicts the trailer trajectory based on a simulation of dynamic models representing the autonomous vehicle and the trailer. With the tracking and prediction of trailer trajectory, an autonomous vehicle safely navigates along a planned trajectory of waypoints along which the trailer is expected or predicted to maintain safe distances away from other objects.

Figure 12A:
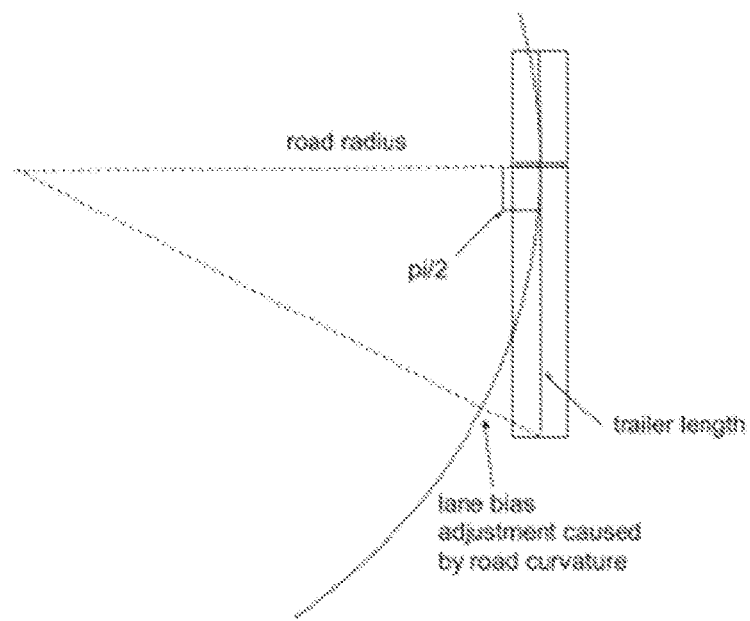
FIGS. 12A and 12B illustrate diagrams that demonstrate tracking of trailer trajectories.
Figure 12B:
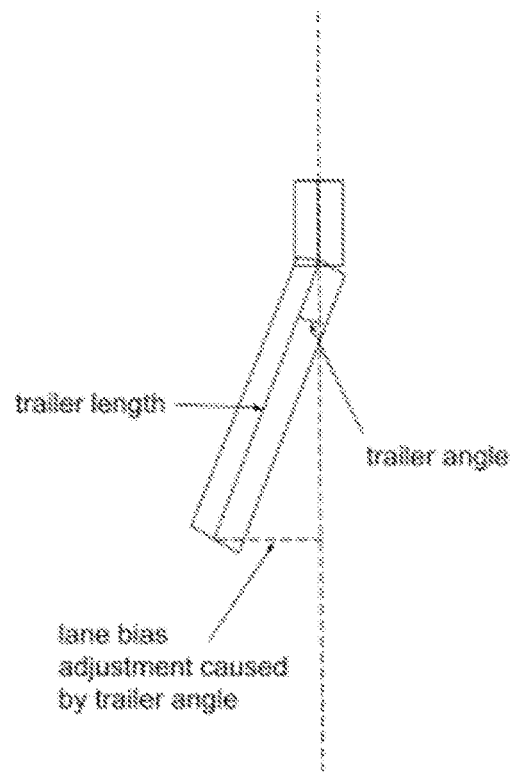

Trailer trajectory tracking is applied in scenarios of road curvature, where the autonomous vehicle adjusts lane biasing within a current lane to account for road curvature. FIGS. 12A and 12B illustrate diagrams that show road curvature affecting lane bias of a trailer.

In some embodiments, a lane bias adjustment value that is needed is caused by two separate parts: road curvature, and trailer angle.

The road curve adjustment is calculated by assuming the trailer angle is zero. The road curve adjustment is then combined with the trailer angle adjustment. Approximation can be used during the calculations, with a bounded error (e.g., 0.01 meters)

VII.(a) Road Curvature

FIG. 12A illustrates a geometry assuming trailer is straight and trailer angle is zero.

The lane bias adjustment caused by road curvature is then equal to sqrt(road_radius^2+trailer_length^2)−road_radius.

This adjustment value is always positive, but in some examples, a sign is assigned based on direction of curvature. In an example coordinate system, the left curve has a positive sign, and the lane bias to the left (like in the illustrated example of FIG. 12A) has a negative sign. So, the final equation should be Lane bias adjustment caused by road curvature=(sqrt(road_radius^2+trailer_length^2)−road_radius)*sign(−curvature).

VII.(b) Trailer Angle

Trailer angle is the angle between the longitudinal directions of the trailer and the tractor, as shown in FIG. 12B. A negative angle value means trailer swings to the left, and positive means right.

The lane bias adjustment caused by trailer angle is then equal to trailer_length*sin(trailer_angle).

With this equation, trailer angle is negative when the trailer swings to the left, and a lane bias to the right (like in the illustrated example of FIG. 12B) has a positive sign. So, the final equation should be: Lane bias adjustment caused by trailer angle=−trailer_length*sin(trailer_angle).

Then, the total lane bias adjustment is equal to the lane bias adjustment caused by road curvature+the lane bias adjustment caused by trailer angle.

Then, the final lane bias amount is equal to an original lane bias amount+total lane bias adjustment.

To avoid extreme cases such as sensor failure, the total lane bias adjustment can be limited to [−0.3, 0.3] meters before adding to the original lane bias amount.

In an applied example, when a detected object is located to the left of the autonomous vehicle, the autonomous vehicle lane biases to the right. The original lane bias amount is then positive, in this example, and the lane bias adjustment is limited to positive values. Similarly for a detected object on the right side, the lane bias adjustment is limited to negative values. The principle is to only add more bias amount, and never reduce it, because the tractor is still there and needs to be considered.

VII.(c) Smoothing Method

To reduce noise and self-exciting behavior, some methods may be used to smooth the input signal.

For the road radius, three points from the map reference line are used, and the autonomous vehicle calculates the radius of the circle formed by these 3 points. The points are sampled at the location of the autonomous vehicle, a point ahead of the autonomous vehicle (e.g., thirty meters ahead), and a point behind the autonomous vehicle (e.g., thirty meters behind).

For trailer angle, a moving average filter may be used to reduce noise.

VIII. Overview

In order to perform the above features, an autonomous vehicle may utilize any of the sensors, particularly the data obtained from the sensors, in conjunction with the computing facilities on-board the autonomous vehicle, such as those associated with or in communication with the VCU. Alternatively, or additionally, the above features may be executed by an autonomous vehicle with aid from an oversight system, or control center, and optionally with aid from a human remote-control operator. The oversight system, and in some cases the remote-control operator, may communicate environmental data, map updates, instructions, or other information to an autonomous vehicle. An on-board map, such as a high-definition map, may be used by an autonomous vehicle to accomplish some of the features described herein, particularly when knowledge of location and local regulations (e.g., speed limits, obligations under the law, traffic conventions, intersection types) is needed to complete a task described in the feature.

While this document refers to an autonomous truck, it should be understood that any autonomous ground vehicle may have such features. Autonomous vehicles which traverse over the ground may include: semis, tractor-trailers, 18 wheelers, lorries, class 8 vehicles, passenger vehicles, transport vans, cargo vans, recreational vehicles, golf carts, transport carts, and the like.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

Implementations of the subject matter and the functional operations described in this patent document can be implemented in various systems, semiconductor devices, ultrasonic devices, digital electronic circuitry, or in computer software, firmware, or hardware, including the structures disclosed in this specification and their structural equivalents, or in combinations of one or more of them. Implementations of aspects of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming languages, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of characteristics that may be specific to particular embodiments or sections of particular inventions. Certain characteristics that are described in this patent document in the context of separate embodiments or sections can also be implemented in combination in a single embodiment or a single section. Conversely, various characteristics that are described in the context of a single embodiment or single section can also be implemented in multiple embodiments or multiple sections separately or in any suitable sub combination. A feature or operation described in one embodiment or one section can be combined with another feature or another operation from another embodiment or another section in any reasonable manner. Moreover, although characteristics may be described above as acting in certain combinations and even initially claimed as such, one or more characteristics from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method of operating an autonomous vehicle, comprising:
    detecting, by a processor of a controller system disposed on the autonomous vehicle, that a group of motorcycles is operating on a roadway on which the autonomous vehicle is located, wherein the group of motorcycles are each located within a pre-determined distance away from one another;
    determining, by the processor of the controller system, an aggregate footprint area that surrounds respective locations of the group of motorcycles;
    dynamically updating, by the processor of the controller system, the aggregate footprint area based on whether an individual motorcycle remains within the pre-determined distance away from other motorcycles of the group; and
    causing, by the processor of the controller system, navigation of the autonomous vehicle that avoids penetration of the aggregate footprint area based on transmitting navigation instructions to one or more subsystems of the autonomous vehicle.

2. The method of claim 1, wherein causing navigation of the autonomous vehicle that avoids penetration of the aggregate footprint area includes determining a trajectory for the autonomous vehicle that maintains a minimum lateral distance away from the aggregate footprint area.

3. The method of claim 1, wherein causing navigation of the autonomous vehicle that avoids penetration of the aggregate footprint area includes:
    associating the aggregate footprint area to one or more particular lanes of the roadway, and
    restricting the autonomous vehicle from entering the one or more particular lanes of the roadway.

4. The method of claim 1, wherein detecting that the group of motorcycles is operating on the roadway includes:
    obtaining a point cloud that captures an individual motorcycle from one or more light detection and ranging (LiDAR) sensing devices located on the autonomous vehicle,
    filtering a subset of the point cloud that is attributed to a micro-Doppler effect of wheels of the individual motorcycle, and
    determining a bounding box and the location of the individual motorcycle using the filtered point cloud.

5. The method of claim 1, wherein the group of motorcycles is detected based on each of the motorcycles being located within a same lane of the roadway.

6. The method of claim 1, wherein detecting that the group of motorcycles is operating on the roadway includes classifying a detected vehicle as an individual motorcycle due to the detected vehicle having three or fewer wheels.

7. The method of claim 1, further comprising:
    classifying, by the processor of the controller system, a behavior state of an individual motorcycle based on a location of the individual motorcycle relative to a split zone that extends between and into two adjacent lanes of the roadway, wherein the behavior state indicates whether the individual motorcycle is lane splitting;
    determining, by the processor of the controller system based on the behavior state of the individual motorcycle, a lane permission parameter for the autonomous vehicle that controls whether a given trajectory determined for the autonomous vehicle is permitted to extend into one of the two adjacent lanes; and
    causing, by the processor of the controller system, the autonomous vehicle to operate in accordance with a trajectory that satisfies the lane permission parameter and avoids penetration of the aggregate footprint area.

8. A system for operating an autonomous vehicle, comprising a computer that includes a processor that executes instructions to cause the system to:
    detect that a group of motorcycles is operating on a roadway on which the autonomous vehicle is located, wherein the group of motorcycles are each located within a pre-determined distance away from one another;
    determine an aggregate footprint area that surrounds respective locations of the group of motorcycles; and
    cause navigation of the autonomous vehicle that avoids penetration of the aggregate footprint area based on transmitting navigation instructions to one or more subsystems of the autonomous vehicle.

9. The system of claim 8, wherein causing navigation of the autonomous vehicle that avoids penetration of the aggregate footprint area includes determining a trajectory for the autonomous vehicle that maintains a minimum lateral distance away from the aggregate footprint area.

10. The system of claim 8, wherein causing navigation of the autonomous vehicle that avoids penetration of the aggregate footprint area includes:
- associating the aggregate footprint area to one or more particular lanes of the roadway, and
- restricting the autonomous vehicle from entering the one or more particular lanes of the roadway.

11. The system of claim 8, wherein detecting that the group of motorcycles is operating on the roadway includes:
- identifying an individual motorcycle in image data captured by one or more cameras located on the autonomous vehicle,
- tracking the individual motorcycle in one or more subsequent sets of image data captured by the one or more cameras, and
- dynamically updating the location of the individual motorcycle based on the tracking.

12. The system of claim 8, wherein the group of motorcycles is detected based on the group of motorcycles each travelling at respective speeds that are within a pre-determined range of each other.

13. A non-transitory computer readable program storage medium having code stored thereon, the code, when executed by a processor, causing the processor to:
- detect that a group of motorcycles is operating on a roadway on which an autonomous vehicle is located, wherein the group of motorcycles are each located within a pre-determined distance away from one another;
- determine an aggregate footprint area that surrounds respective locations of the group of motorcycles; and
- cause navigation of the autonomous vehicle that avoids penetration of the aggregate footprint area based on transmitting navigation instructions to one or more subsystems of the autonomous vehicle.

14. The non-transitory computer readable program storage medium of claim 13, wherein causing navigation of the autonomous vehicle that avoids penetration of the aggregate footprint area includes determining a trajectory for the autonomous vehicle that maintains a minimum lateral distance away from the aggregate footprint area.

15. The non-transitory computer readable program storage medium of claim 13, wherein causing navigation of the autonomous vehicle that avoids penetration of the aggregate footprint area includes:
- associating the aggregate footprint area to one or more particular lanes of the roadway, and
- restricting the autonomous vehicle from entering the one or more particular lanes of the roadway.

16. The non-transitory computer readable program storage medium of claim 13, wherein detecting that the group of motorcycles is operating on the roadway includes:
- identifying an individual motorcycle in radar data obtained from one or more radar devices located on the autonomous vehicle, and
- determining the location of the individual motorcycle from the radar data.

17. The non-transitory computer readable program storage medium of claim 13, wherein the group of motorcycles is detected based on a line-of-sight extending between two respective motorcycles being unobstructed by another vehicle.

* * * * *